(12) United States Patent
Van Kervinck et al.

(10) Patent No.: US 11,137,689 B2
(45) Date of Patent: Oct. 5, 2021

(54) METHOD AND SYSTEM FOR FABRICATING UNIQUE CHIPS USING A CHARGED PARTICLE MULTI-BEAMLET LITHOGRAPHY SYSTEM

(71) Applicant: ASML Netherlands B.V., Veldhoven (NL)

(72) Inventors: Marcel Nicolaas Jacobus Van Kervinck, The Hague (NL); Vincent Sylvester Kuiper, The Hague (NL)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 16/331,538

(22) PCT Filed: Sep. 8, 2017

(86) PCT No.: PCT/JP2017/033370
§ 371 (c)(1),
(2) Date: Mar. 8, 2019

(87) PCT Pub. No.: WO2018/047984
PCT Pub. Date: Mar. 15, 2018

(65) Prior Publication Data
US 2019/0205495 A1 Jul. 4, 2019

Related U.S. Application Data

(63) Continuation of application No. 15/389,558, filed on Dec. 23, 2016, now abandoned.
(Continued)

(51) Int. Cl.
*G03F 7/20* (2006.01)
*H01L 21/027* (2006.01)
(Continued)

(52) U.S. Cl.
CPC ...... *G03F 7/70383* (2013.01); *H01J 37/3174* (2013.01); *H01L 21/027* (2013.01);
(Continued)

(58) Field of Classification Search
CPC ...... G03F 7/20; G03F 7/2037; G03F 7/70383; G03F 7/70033; H01L 21/76816;
(Continued)

(56) References Cited

U.S. PATENT DOCUMENTS 5,699,266 A * 12/1997 Chung ................. G06F 30/398
716/51
6,646,275 B2 * 11/2003 Oae ........................ B82Y 10/00
250/398
(Continued)

FOREIGN PATENT DOCUMENTS

CN 102844715 A 12/2012
CN 103649836 A 3/2014
(Continued)

OTHER PUBLICATIONS

Search Report issued by the Chinese Patent Office in related Application No. 2017800688865, dated Mar. 12, 2020 (2 pgs.).
(Continued)

*Primary Examiner* — Helen Rossoshek
(74) *Attorney, Agent, or Firm* — Finnegan, Henderson, Farabow, Garrett & Dunner, LLP

(57) ABSTRACT

A method of creating electronic devices such as semiconductor chips using a maskless lithographic exposure system such as a charged particle multi-beamlet lithography system (301A-301D). The maskless lithographic exposure system comprises a lithography subsystem (316) including a maskless pattern writer such as a charged particle multi-beamlet lithography machine (1) or ebeam machine. The method comprises introducing unique chip design data (430) or
(Continued)

information related thereto into pattern data comprising common chip design data before streaming the pattern data to the maskless pattern writer.

20 Claims, 11 Drawing Sheets

Related U.S. Application Data

(60) Provisional application No. 62/385,049, filed on Sep. 8, 2016, provisional application No. 62/458,040, filed on Feb. 13, 2017.

(51) Int. Cl.
| | |
|---|---|
| H01L 23/00 | (2006.01) |
| H01L 21/768 | (2006.01) |
| H01J 37/317 | (2006.01) |
| G06F 30/392 | (2020.01) |
| G06F 30/394 | (2020.01) |
| G06F 119/18 | (2020.01) |

(52) U.S. Cl.
CPC ...... *H01L 21/0274* (2013.01); *H01L 21/0277* (2013.01); *H01L 21/76816* (2013.01); *H01L 23/573* (2013.01); *G06F 30/392* (2020.01); *G06F 30/394* (2020.01); *G06F 2119/18* (2020.01); *H01J 2237/31764* (2013.01)

(58) Field of Classification Search
CPC ............... H01L 21/0274; H01L 21/263; H01L 21/0277; H01L 23/573; H01L 21/768; H01L 27/0207; H01J 37/3174; H01J 2237/31754; H01J 2237/31774; H01J 37/3175; H01J 2237/30472; H01J 2237/31761; H01J 37/21; H01J 2237/31764

See application file for complete search history.

(56) References Cited

U.S. PATENT DOCUMENTS

| | | | | |
|---|---|---|---|---|
| 6,833,854 | B1* | 12/2004 | Sandstrom | G03F 7/70291 |
| | | | | 250/365 |
| 7,495,245 | B2* | 2/2009 | Zani | B82Y 10/00 |
| | | | | 250/492.22 |
| 7,532,378 | B2* | 5/2009 | Tanaka | B23K 26/067 |
| | | | | 359/224.2 |
| 7,839,484 | B2* | 11/2010 | Yamaguchi | G03F 7/7005 |
| | | | | 355/53 |
| 7,842,525 | B2 | 11/2010 | Sandstrom | |
| 7,936,445 | B2* | 5/2011 | Hintersteiner | G03F 7/706 |
| | | | | 355/67 |
| 8,143,602 | B2* | 3/2012 | Chen | B82Y 40/00 |
| | | | | 250/492.1 |
| 9,032,342 | B2* | 5/2015 | Wahlsten | G03F 7/70383 |
| | | | | 716/55 |
| 9,595,419 | B1* | 3/2017 | Monahan | H01J 37/3005 |
| 10,026,589 | B1* | 7/2018 | Monahan | H01J 37/3005 |
| 10,079,206 | B2* | 9/2018 | van Kervinck | H01L 21/768 |
| 10,312,091 | B1* | 6/2019 | Smayling | H04L 9/0861 |
| 10,418,324 | B2* | 9/2019 | van Kervinck | H01L 29/0684 |
| 10,522,472 | B2* | 12/2019 | De Langen | H04L 9/3271 |
| 10,523,433 | B1* | 12/2019 | Monahan | H04L 9/30 |
| 10,527,946 | B2* | 1/2020 | De Jager | B22F 3/1055 |
| 10,527,950 | B2* | 1/2020 | Smakman | G03F 7/70508 |
| 10,600,733 | B2* | 3/2020 | van Kervinck | H01L 29/0692 |
| 10,712,669 | B2* | 7/2020 | Smakman | G03F 7/70391 |
| 10,714,427 | B2* | 7/2020 | De Langen | G06F 21/73 |
| 2005/0177268 | A1 | 8/2005 | Morinaga et al. | |
| 2006/0064191 | A1 | 3/2006 | Naya et al. | |
| 2007/0195834 | A1 | 8/2007 | Tanka et al. | |
| 2007/0242252 | A1 | 10/2007 | Tinnemans | |
| 2012/0236369 | A1* | 9/2012 | Pasupuleti | G11B 7/00455 |
| | | | | 358/474 |
| 2014/0160452 | A1* | 6/2014 | De Jager | G03F 7/70375 |
| | | | | 355/53 |
| 2014/0170566 | A1 | 6/2014 | Ivansen et al. | |
| 2014/0264085 | A1* | 9/2014 | Van De Peut | H01J 37/3175 |
| | | | | 250/492.3 |
| 2015/0026650 | A1 | 1/2015 | Yeric | |
| 2018/0068047 | A1* | 3/2018 | van Kervinck | H01L 21/0274 |
| 2019/0011841 | A1* | 1/2019 | De Jager | G03F 7/704 |
| 2020/0098697 | A1* | 3/2020 | De Langen | G06F 21/44 |
| 2020/0203125 | A1* | 6/2020 | Van Kervinck | H01L 27/1104 |
| 2020/0219806 | A1* | 7/2020 | van Kervinck | H01L 21/768 |
| 2020/0350259 | A1* | 11/2020 | De Langen | G09C 5/00 |

FOREIGN PATENT DOCUMENTS

| | | |
|---|---|---|
| EP | 0712136 A2 | 5/1996 |
| JP | S59-087817 A | 5/1984 |
| JP | 2001-337439 A | 12/2001 |
| JP | 2002-107904 A | 4/2002 |
| JP | 2002-351931 A | 12/2002 |
| JP | 2009-158776 A | 7/2009 |
| JP | 2011-108830 A | 6/2011 |
| JP | 2012-527765 T | 11/2012 |
| JP | 2013-521641 T | 6/2013 |
| JP | 2018-041950 A | 3/2018 |
| JP | 2018-041951 A | 3/2018 |
| TW | 520564 | 2/2003 |
| TW | 201107898 A | 3/2011 |

OTHER PUBLICATIONS

First Office Action issued by the Chinese Patent Office in related Application No. 2017800688865, dated Mar. 12, 2020 (11 pgs.).
Supplementary European Search Repot issued in European Application No. EP 17 84 8921; dated Jun. 2, 2021 (2 pgs.).
N. William Parker et al., "A high throughput electron-beam direct-write lithography system", Microlithography World, Pennwell Corporation, US, vol. 9, No. 3, Jan 1, 2000 (Jan 1, 2000), pp. 22, 24-25, 30, XP009195346, ISSN: 1074-407X.
Office Action of the Intellectual Property Office of Taiwan issued in related Taiwanese Patent Application No. 106130855; dated Jun. 8, 2021 (22 pgs.).
Notice of Reasons for Rejection issued by the Japan Patent Office in related Japanese Patent Application No. 2019-513090; dated Aug. 16, 2021 (17 pgs.).

* cited by examiner

METHOD AND SYSTEM FOR FABRICATING UNIQUE CHIPS USING A CHARGED PARTICLE MULTI-BEAMLET LITHOGRAPHY SYSTEM

TECHNICAL FIELD

The invention relates to a method of creating, i.e. fabricating unique electronic devices such as semiconductor chips. More specifically, the invention relates to the fabrication of unique chips using a charged particle multi-beamlet lithography machine. Consequently the invention equally relates to unique chips produced using this new method of manufacture, as well as to so called "fabs", i.e. manufacturing facilities applying this novel method, and to maskless lithographic exposure system adapted for executing the improved method of manufacture. The invention further relates to a computer-implemented method for generating pattern data for fabricating unique electronic devices such as semiconductor chips. The invention also relates to a computer-implemented method for generating non-common chip design data for fabricating unique electronic devices such as semiconductor chips. The invention further relates to data processing systems, computer program products and computer-readable storage media related to the computer implemented methods.

BACKGROUND ART

In the semiconductor industry, lithography systems are used to create, i.e. fabricate such electronic devices, typically in the form of integrated circuits formed on silicon wafer, commonly referred to as semiconductor chips. Photolithography utilizes reusable optical masks to project an image of a pattern representing the desired circuit structures onto a silicon wafer as part of the manufacturing process. The mask is used repeatedly to image the same circuit structures on different parts of a silicon wafer and on subsequent wafers, resulting in a series of identical chips being fabricated with each wafer. Each chip having an identical circuit design.

In contemporary days, various technologies relating to data security, traceability, and counterfeiting create an increasing need for unique chips having unique circuits or codes, or other unique hardware features for diversification of the chips. Such unique chips are known and often implement a security related operation in an obfuscated manner requiring the chip to be truly unique. The known unique chips are typically realized after the manufacture of a chip, e.g. by manufacturing a series of identical chips using mask based lithography and then, after manufacture, disrupting certain connections in the chip or by assessing the uniqueness of the chip afterwards upon inspection and control of certain features. The masks used in this process are expensive to produce, and manufacturing a unique masks for each single chip is clearly much too expensive, for which reason mask based photolithography is considered unsuitable for fabricating unique chips.

Hence it has been suggested to utilize maskless lithography for the purpose of creating unique chips. With maskless lithography no hard mask is used, and instead the required pattern representing the circuit design is input to the maskless lithography system in the form of a design layout data file such as a GDSII or OASIS file containing the circuit design layout to be transferred to the target, e.g. wafer, to be exposed by the maskless lithography system.

A maskless lithography and data input system is disclosed in WO 2010/134026 in the name of Applicant of the present invention. WO 2010/134026 is hereby incorporated by reference in its entirety. The disclosed maskless system write patterns onto wafers directly using charged particle beamlets such as electron beamlets. Because the desired pattern for exposing each chip is represented as data instead of a mask, becomes possible to utilize such system for the manufacture of unique chips. The pattern data that is input to the exposure system, representing the unique electronic devices or chips to be created, may be made unique by using a different design layout data input file, e.g. a GDSII or OASIS input file, for each unique electronic device to be created.

WO 2011/117253 and WO2011/051301, both assigned to the Applicant of the present invention and hereby incorporated by reference in their entirety, disclose various examples of electronic devices or chips that can be created using a charged particle lithography system.

A straight forward method of creating secure, at least unique devices, i.e. using the known maskless exposure system, may however not be optimized, at least adapted for securely producing unique electronic devices. Disadvantageously, the processing of design layout data file such as GDSII or OASIS files associated herewith is typically performed outside of the operations of the operator of the lithography system. Moreover, the processed GDSII/OASIS files may be used and stored over a longer period of time. It is deemed desirable according insight underlying and in fact part of the present invention to minimize exposure and exposure time of the unique design data used in the creation of the unique electronic devices or chips for security reasons, as the uniqueness of the electronic device or chip will typically be used for data security, traceability and anti-counterfeiting applications.

SUMMARY OF THE INVENTION

The present invention solves the identified problems of the prior art, by identifying a common or identical part and a non-common or unique part in the chip layout, the identical part being the same in multiple chips and the unique part being unique to a single chip. The identification of a unique part is used to introduce pattern data or information related thereto or for creating the same to the data processing system of the maskless exposure system at a very late stage, typically only after the part thereof that is controlled, at least is part of the generic part in a so called fab or foundry, more in general of a manufacturing process in a factory.

The identical part may also be referred to as the common part. The identical part may also be referred to as the individualized part or the non-common part.

Where at manufacture optical lithography is applied in conjunction with maskless lithographic exposures, the identical part may be created using photolithography or charged particle multi-beam lithography. The unique part of a target, electronic device in particular is created using charged particle multi-beam lithography. The pattern data used to control the beamlets in the charged particle lithography system may be designed to include a common chip design part that can be used in the creation of multiple chips and a unique chip design part that is used in the creation of a unique chip. The unique chip design part can in particular be added to the pattern data just before exposing a target such as a wafer. This may be either in the form of unique pattern data or in the form of information used to create the unique pattern data.

Advantageously the method of creating secure devices according to this method, the computer-implemented method for generating pattern data and the computer-implemented method for generating non-common chip design data enable secure devices to be created while the unique design data remains under control of the operator of the lithography system and the exposure time of the unique design data is minimized, hence forms a major, new measure and manufacturing method, which enables applying security at manufacturing unique electronic devices in use of the known maskless exposure based manufacturing method. An advantageous additional effect is that the required processing power and memory may remain low, in that a common chip design part can be reused for the creation of multiple chips, where utilizing the known, straight forward manner of creating unique chips would require capacity and processing time for each unique chip design manufactured utilizing the known method of producing unique chips using maskless, generally charged particle based lithography.

According to an aspect of the invention a method of creating electronic devices is proposed. The electronic devices are for example semiconductor chips. The electronic devices can be created using a maskless lithographic exposure system such as a charged particle multi-beamlet lithography system. The maskless lithographic exposure system can comprise a lithography subsystem including a maskless pattern writer such as a charged particle multi-beamlet lithography machine or ebeam machine. The method can comprise introducing unique chip design data or information related thereto into pattern data comprising common chip design data before streaming the pattern data to the maskless pattern writer.

In an embodiment the maskless lithographic exposure system can comprise a data processing system. The pattern writer can be controlled by the data processing system. The data processing system can be adapted to be fed by software data relating to a pattern to be transferred to a target such as a wafer in which the electronics devices are to be effected. Provision of the patterning data to the pattern writer by said data processing system can be realized on the basis of said pattern data fed to the exposure system. The method can comprise feeding a common part of the pattern data for electronics devices to be effected on the target at a first data entry of the data processing system, in particular at an instance thereof related to processing pattern data per target. The method can comprise feeding unique pattern data or information at a second data entry of the data processing system at an instance thereof downstream the data flow in the data processing system relative to the first data entry, in particular capable of processing pattern data per part, such as field, of the target.

In an embodiment the maskless lithographic exposure system can comprise an input generator for inputting a generated unique chip pattern or related information to a process job generator of the execution system in an encrypted manner, a machine control part of the pattern writer converting the encrypted code into patterning data, intermixed with the patterning data in an obfuscated manner.

In an embodiment the unique pattern data or related information can be generated at, or integral with the entry of unique chip pattern or related information, in particular in an obfuscated manner, e.g. utilizing encrypted association with a device number of the unique device created with said such created unique data or information.

According to an aspect of the invention an electronic device, such as semiconductor chip, is proposed. The electronic device can be created using the above described method.

According to an aspect of the invention a method of processing a wafer is proposed. At manufacture of the wafer, a first part of the wafer can be exposed for creating an identical part of a chip which is identical to other chips created on the wafer. A second part of the wafer can be exposed for creating a unique part of said chip which is different from other chips created on the wafer.

In an embodiment the first part of the wafer is exposed using a mask exposure, also known as photolithography, for example using krypton-fluoride (KrF) laser exposure, and the second part of the wafer can be exposed using an electron beam (e-beam) exposure.

In an embodiment the second part of the wafer can be exposed using beamlets that are controlled using pattern data comprising a common chip design part that is reusable with other chips and a unique chip design part that is unique for the chip.

In an embodiment a step of applying a conductive layer, for example using a chemical vapor deposition with Tungsten followed by chemical-mechanical planarization, can be used only after the electron beam exposure.

In an embodiment the wafer can comprise a first under layer and a second under layer, the under layers for example comprising a SOC and a SiARC hard mask layer, that are used with both the mask exposure and the electron beam exposure.

In an embodiment, at the start of the process the wafer can comprise a photo resist layer, for example a KrF resist layer, and an isolation layer such as a SiO2 layer. The method can comprise exposing and developing the photo resist layer at the first part of the wafer using the mask exposure. The method can comprise etching the isolation layer based on the developed photo resist layer and stripping the photo resist layer from the wafer. The method can comprise applying a conductive layer onto the etched and stripped isolation layer, for example using a chemical vapor deposition with Tungsten. The method can comprise chemical-mechanical planarization the wafer resulting in the isolation layer being the top layer and comprising isolation material and conductive material as defined by the mask exposure method. The method can comprise next, applying a first under layer and a second under layer, the under layers for example comprising a SOC and a SiARC hard mask layer, and an e-beam resist layer (206) onto the wafer. The method can comprise exposing and developing the e-beam resist layer at the second part of the wafer using the electron beam exposure. The method can comprise etching the first under layer and the second under layer based on the developed e-beam resist layer and stripping the e-beam resist layer from the wafer. The method can comprise etching the isolation layer based on the etched first and second under layers and stripping the first and second under layers from the wafer. The method can comprise applying a further conductive layer onto the etched and stripped isolation layer, for example using a chemical vapor deposition with Tungsten. The method can comprise chemical-mechanical planarization the wafer resulting in the isolation layer being the top layer and comprising isolation material and conductive material as defined by the mask exposure method and the electron beam exposure method.

In an embodiment, at the start of the process the wafer can comprise a photo resist layer, for example a KrF resist layer, the first and second under layers, and an isolation layer such as a SiO2 layer. The method can comprise exposing and developing the photo resist layer at the first part of the wafer using the mask exposure. The method can comprise etching the first under layer based on the developed photo resist layer and stripping the photo resist layer from the wafer. The method can comprise applying an e-beam resist layer onto the etched first under layer and part of the first under layer at the second part of the wafer. The method can comprise exposing and developing the e-beam resist layer at the second part of the wafer using the electron beam exposure. The method can comprise etching the first under layer and the second under layer based on the developed e-beam resist layer and stripping the e-beam resist layer from the wafer. The method can comprise etching the isolation layer based on the etched first and second under layers and stripping the first and second under layers from the wafer. The method can comprise applying a conductive layer onto the etched and stripped isolation layer of the first part and the second part of the wafer, for example using a chemical vapor deposition with Tungsten. The method can comprise chemical-mechanical planarization the wafer resulting in the isolation layer being the top layer and comprising isolation material and conductive material as defined by the mask exposure and the electron beam exposure.

In an embodiment the first part and the second part of the wafer can be exposed using electron beam exposure.

In an embodiment, at the start of the process the wafer can comprise an e-beam resist layer, a first under layer and a second under layer, the under layers for example comprising a SOC and a SiARC hard mask layer, and an isolation layer such as a SiO2 layer. The method can comprise exposing the e-beam resist layer of the wafer using the electron beam exposure, wherein the first part of the wafer can be exposed using beamlets that are controlled using a common chip design part in pattern data that is reusable with other chips, and wherein the second part of the wafer can be exposed using beamlets that are controlled using a unique chip design part in the pattern data that is unique for the chip. The method can comprise developing the e-beam resist layer of wafer. The method can comprise etching the first under layer and the second under layer based on the developed e-beam resist layer and stripping the e-beam resist layer from the wafer. The method can comprise etching the isolation layer based on the etched first and second under layers and stripping the first and second under layers from the wafer. The method can comprise applying a conductive layer onto the etched and stripped isolation layer of the first part and the second part of the wafer, for example using a chemical vapor deposition with Tungsten. The method can comprise chemical-mechanical planarization the wafer resulting in the isolation layer being the top layer and comprising isolation material and conductive material as defined by the electron beam exposure for both the first part and the second part of the wafer.

According to an aspect of the invention an electronic device, such as semiconductor chip, is proposed. The electronic device can be created using the boce described method.

According to an aspect of the invention a maskless lithographic exposure system such as a charged particle multi-beamlet lithography system is proposed. The system can comprise a lithography subsystem including a maskless pattern writer such as a charged particle multi-beamlet lithography machine or electron beam exposure machine. The maskless lithographic exposure system can be configured to expose a pattern on a surface of a target such as a wafer according to pattern data. The pattern data can comprise common chip design data, the common chip design data describing a chip layout design applicable to multiple chips. The maskless lithographic exposure system can be configured to insert unique chip design data into the pattern data before streaming the pattern data to the maskless pattern writer.

In an embodiment a pattern data processing system can be configured to pre-process a vector-based input design file used for generating the common chip design data. The pattern data processing system can be configured to generate the pattern data from the pattern data and the common chip design data.

In an embodiment the maskless lithographic exposure system can comprise a pattern data processing system. The pattern data processing system can be configured to pre-process a vector based input design file used for generating the pattern data comprising the common chip design data. The maskless lithographic exposure system can comprise a pattern streamer. The pattern streamer can be configured to receive the pattern data comprising the common chip design data and to insert the unique chip design data into the pattern data.

In an embodiment the maskless lithographic exposure system can comprise a pattern streamer configured to stream the pattern data comprising the common chip design data to the lithography subsystem. The lithography subsystem can be configured to insert the unique chip design data into the pattern data.

In an embodiment the maskless lithographic exposure system can comprise an element control unit for controlling the operation of the lithography subsystem. The lithography subsystem can be configured to receive the unique chip design data from the element control unit, for example in the form of a process job.

In an embodiment the maskless lithographic exposure system can comprise a host system for controlling the operation of the maskless pattern writer. The lithography subsystem can be configured to receive the unique chip design data from the host system.

In an embodiment the maskless lithographic exposure system can comprise a unique data generator for generating the unique chip design data based on secret data.

In an embodiment the unique data generator can be configured to receive the secret data from an external provider in an encrypted format.

According to an aspect of the invention computer-implemented method for generating pattern data is proposed. The pattern data can represent at least a part of one or more electronic devices, such as a semiconductor chips. The electronic devices can be created under control of the pattern data using a maskless lithographic exposure system, such as a charged particle multi-beamlet lithography system. The maskless lithographic exposure system can comprise a lithography subsystem including a maskless pattern writer such as a charged particle multi-beamlet lithography machine or ebeam machine. The method can comprise inserting non-common chip design data or information related thereto into common chip design data to obtain the pattern data before streaming the pattern data to the maskless pattern writer.

In an embodiment the common chip design data can define a common design layout part of an electronic device to be created on a wafer using the maskless pattern writer under control of the pattern data. The common design layout part can be identical to other electronic devices created on the wafer. The non-common chip design data can define a non-common design layout part of said electronic device to be created on the wafer using the maskless pattern writer under control of the pattern data. The non-common design layout part can be different from other chips created on the wafer.

In an embodiment the common design layout part can be the same for all electronic devices of a set of electronic devices. The non-common design layout part can be the same for only a subset of the electronic devices of the set and is different for other ones of the electronic devices of the set.

In an embodiment the common chip design data can describe at least a portion of a chip layout design applicable for a plurality of chips. The common chip design data can include design data describing at least one of a plurality of electrical circuit elements and a plurality of connections between electrical circuit elements, for at least one layer of the chip layout.

In an embodiment the unique or non-common chip design data can describe at least a portion of a chip layout design applicable for a single chip of the plurality of chips. The unique or non-common chip design data can include design data describing at least one of a plurality of electrical circuit elements and a plurality of connections between electrical circuit elements, for at least one layer of the chip layout.

In an embodiment the unique or non-common chip design data can include design data describing at least one of a plurality of electrical circuit elements and a plurality of connections between electrical circuit elements, for only one layer of the chip layout.

In an embodiment the unique or non-common chip design data can include design data describing via connections between two or more layers of the chip layout.

In an embodiment the unique or non-common chip design data can include design data describing active regions of electrical circuit elements of the chip layout.

In an embodiment the method can further comprise extracting the non-common chip design data or the information related thereto from a process job.

In an embodiment the method can comprise processing the non-common chip design data and the common chip design data in a vector based data format.

In an embodiment the method can further comprise rasterizing the common chip design data from a vector based data format into a bitmap based data format before inserting the non-common chip design data into the common chip design data.

In an embodiment the method can further comprise rasterizing the pattern data into a blanker data format before streaming the pattern data to the maskless pattern writer.

In an embodiment the method can further comprise streaming the pattern data to the maskless pattern writer.

According to an aspect of the invention a lithography system is proposed that can be configured to perform the above described method.

According to an aspect of the invention a data processing system is proposed comprising a processor configured to perform the method for generating data of one or more of the above described embodiments.

According to an aspect of the invention an electronic device, such as semiconductor chip, is proposed. The electronic device can be created using the maskless lithographic exposure system described above.

In an embodiment the electronic device can be a truly unique semiconductor chip different from any other created semiconductor chip.

According to an aspect of the invention an electronic device, such as a semiconductor chip, is proposed. The electronic device can be a member of a set of semiconductor chips, comprising: a common design layout part which is the same for all of the semiconductor chips of the set; and a non-common design layout part which is the same for only a subset of the semiconductor chips of the set and is different for other ones of the semiconductor chips of the set. The non-common design layout part can be created using a maskless lithographic exposure system based on secret data provided to the maskless lithographic exposure system during creation of the non-common design layout part.

According to an aspect of the invention an electronic device, such as a semiconductor chip, is proposed. The electronic device can be a member of a set of semiconductor chips. The semiconductor chip can comprise a common design layout part and a non-common design layout part formed in three or more layers of the semiconductor chip comprising: a common design layout part which is the same for all of the semiconductor chips of the set; and a non-common design layout part which is the same for only a subset of the semiconductor chips of the set. The non-common design layout part can be formed on at least a first one of the layers having a second one of the layers above the first layer and having a third one of the layers below the first layer.

According to an aspect of the invention an electronic device, such as a semiconductor chip, is proposed. The electronic device can be a member of a set of semiconductor chips. The semiconductor chip can comprise a common design layout part and a non-common design layout part formed in a plurality of layers of the semiconductor chip comprising: a common design layout part which is the same for all of the semiconductor chips of the set; and a non-common design layout part which is the same for only a subset of the semiconductor chips of the set. The non-common design layout part can include at least one of: connections between metal layers of the plurality of layers; connections between a metal layer and a gate in a contact layer of the plurality of layers; connections in a local interconnect layer of the plurality of layers; and a P- or N-doped active region of a transistor or diode of one of the plurality of layers.

In an embodiment the common design layout part and the non-common design layout part can be interconnected to form an electronic circuit.

In an embodiment the electronic device can comprise at least one input terminal for receiving a challenge and at least one output terminal for outputting a response. The electronic circuit can form a challenge-response circuit connected to the at least one input terminal and the at least one output terminal. The challenge-response circuit can be adapted for generating a response at the at least one output terminal based on a challenge applied to the at least one input terminal. The challenge and the response can have a predetermined relationship.

According to an aspect of the invention a semiconductor fabrication plant is proposed. The semiconductor fabrication plant can comprise a maskless lithography exposure system as described above.

According to an aspect of the invention a computer program product is proposed, implemented on computer-readable non-transitory storage medium, comprising instructions which, when the computer program product is executed by a computer, cause the computer to carry out the method for generating data of one or more of the above described embodiments.

According to an aspect of the invention a computer-readable non-transitory storage medium is proposed comprising instructions which, when executed by a computer, cause the computer to carry out the method for generating data of one or more of the above described embodiments.

According to an aspect of the invention a computer-implemented method for generating non-common chip design data is proposed. The method can comprise receiving secret data from an external provider. The method can further comprise generating the non-common chip design data based on the secret data, wherein the non-common chip design data defines a non-common design layout part of an electronic device to be created on a wafer using a maskless pattern writer, the non-common design layout part being different from other chips created on the wafer.

In an embodiment the secret data can be received in an encrypted form. The method can further comprise decrypting the secret data before generating the non-common chip design data.

In an embodiment the secret data can comprise at least one of a secret key and a secret identification.

In an embodiment the method can further comprise receiving product identification information or serial number information related to a chip to be manufactured from a manufacturing database. The method can further comprise receiving batches of identification/key pairs from a key management service. The method can further comprise controlling the generation of the non-common chip design data using the received product identification information or serial number information and the received identification/key pairs.

According to an aspect of the invention a data processing system is proposed comprising a processor configured to perform the method for generating non-common chip design data of one or more of the above described embodiments.

According to an aspect of the invention a computer program product is proposed, implemented on computer-readable non-transitory storage medium, comprising instructions which, when the computer program product is executed by a computer, cause the computer to carry out the method for generating non-common chip design data of one or more of the above described embodiments.

According to an aspect of the invention a computer-readable non-transitory storage medium is proposed comprising instructions which, when executed by a computer, cause the computer to carry out the method for generating non-common chip design data of on or more of the above described embodiments.

Various aspects and embodiments of the invention are further defined in the following description and claims.

Hereinafter, embodiments of the invention will be described in further detail. It should be appreciated, however, that these embodiments may not be construed as limiting the scope of protection for the present invention.

BRIEF DESCRIPTION OF THE DRAWINGS

Embodiments will now be described, by way of example only, with reference to the accompanying schematic drawings in which corresponding reference symbols indicate corresponding parts, and in which.

The figures are meant for illustrative purposes only, and do not serve as restriction of the scope or the protection as laid down by the claims.

DESCRIPTION OF EMBODIMENTS

In the following examples reference is made to semiconductor chips, but it is to be understood that the invention is not limited to chips and applies more generally to the creation of electronic devices having individualized, e.g. unique features. The electronic device may be a read only memory (ROM). For example, batches of chips with individualized ROM load may be created using the invention. Such batches are typically small batches, e.g. created from one or less than one wafer.

The process performed by charged particle multi-beamlet lithography is also being referred to as an electron beam or e-beam exposure. The electron beam exposure method is a maskless exposure method. The electron beams used for writing a target such as a wafer during electron beam exposure are also being referred to as beamlets.

Unique chips are designed to be unique with respect to other chips. This does not exclude the possibility that more than one unique chip can be made using the invention, for example to create a spare unique chip for use in case the original unique chip is damaged, to created batches of the same chip or for any other reason. A unique semiconductor chip that is functionally different from any other semiconductor chip may be referred to as a truly unique chip. The creation of a visually readable unique ID on a chip may also be regarded as creating a unique chip. Copies of the unique chip may be made by repeating the creation of the chip on different wafers or a single wafer may include one or more copies of the unique chip.

Figure 1:
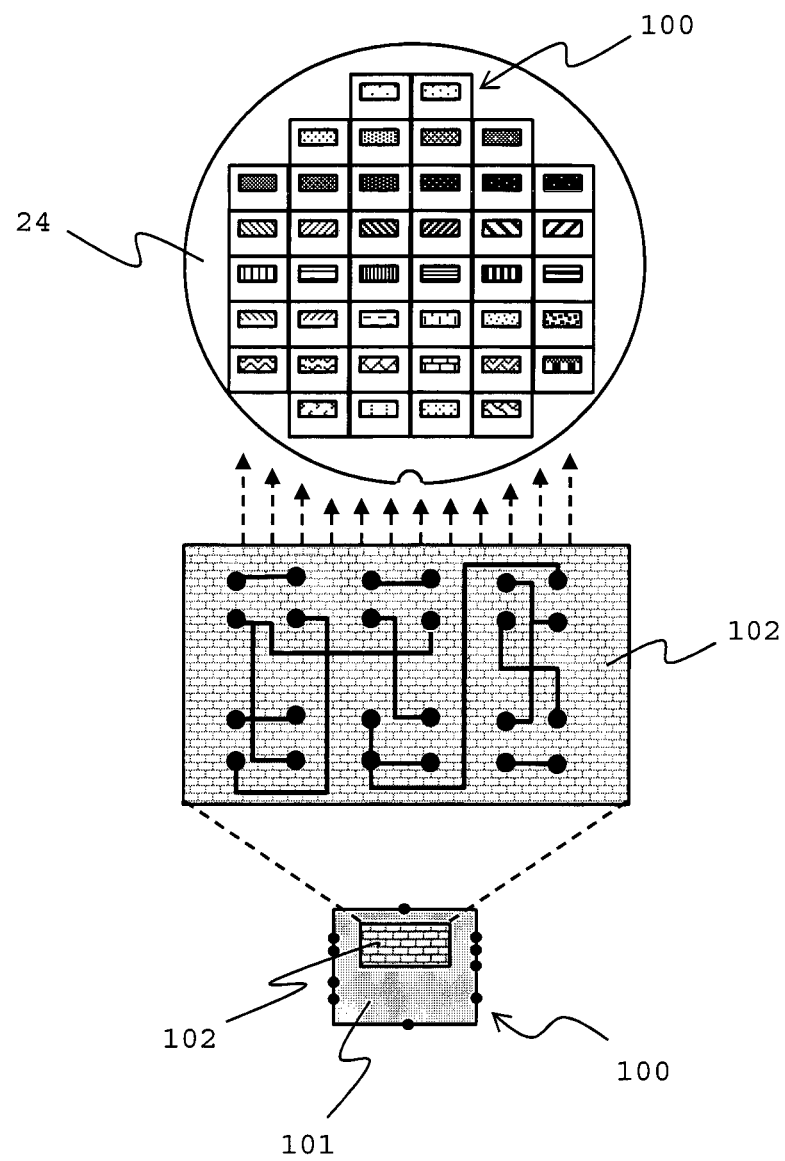
FIG. 1 shows a simplified unique chip and a wafer with multiple unique chips of an exemplary embodiment of the invention.

FIG. 1 shows an exemplary simplified unique chip 100 containing a common part 101 and an individualized area 102. The common part 101 may be replicated in other chips created on the wafer 24 resulting in multiple chips having the same identical part. The individualized area 102 may be different from other chips created on the wafer 24. This is illustrated in the top of FIG. 1 where a wafer 24 is shown containing a unique chip 100 and 39 other unique chips, each unique chip having a different individualized area. The combined common part 101 and individualized area 102 may result in a unique chip 100.

The individualized area 102 may be realized by selecting and writing specific structures, such as vias as illustrated in the middle part of FIG. 1 by the black dots. Other unique chips may have different structures such as vias resulting in the realization of different interconnections within a layer or between layers of the electronic circuit.

Alternatively or additionally to specific structures, other connections between metal layers, connections between a metal layer and a gate e.g. in a contact layer, connections in a local interconnect layer, and/or P or N implants of certain parts of a transistor or diode may be selected and written to realize the individualized area 102.

The common part 101 may be created using photolithography or charged particle multi-beam lithography. The individualized area is typically created using charged particle multi-beam lithography. Moreover, the pattern data used to control the beamlets in the charged particle lithography system may be designed to include a common chip design part that is used for multiple chips on the wafer and a unique part that is used for the individualized area. For the reasons set out in the background section it is undesirable to generate the pattern data including the common chip design part and the unique chip design part at once. Therefore the lithography system has been adapted to enable insertion of the unique chip design part into the pattern data at a later stage, i.e. close to the actual patterning of the wafer. This will be explained in more detail in conjunction with FIGS. 4A-4D and FIG. 5.

Figure 2:
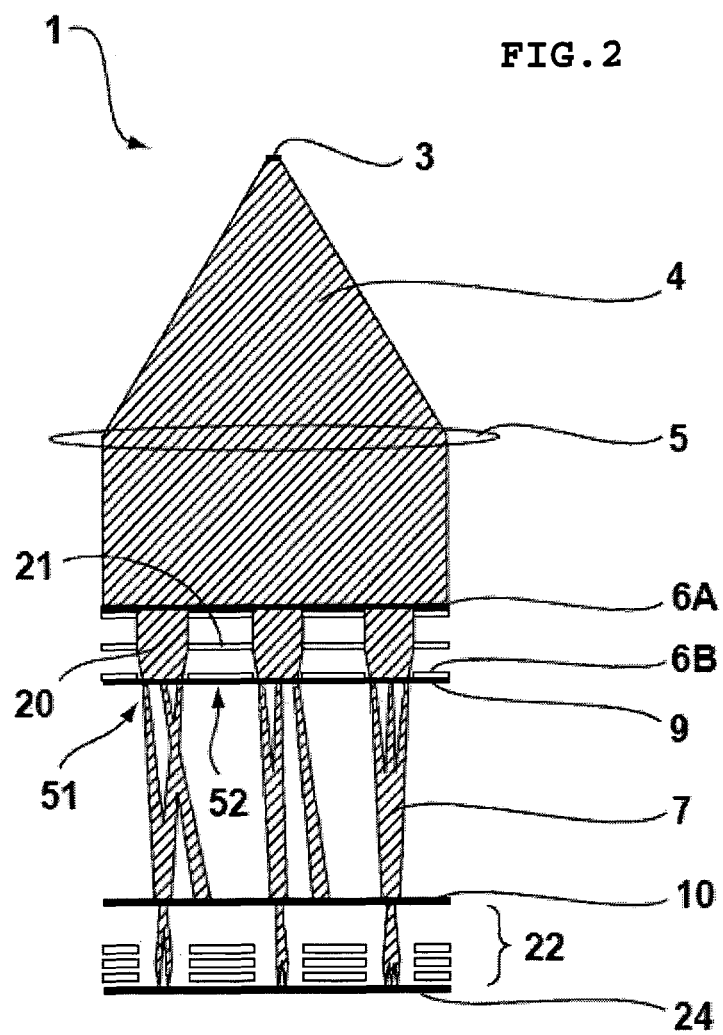
FIG. 2 shows a simplified schematic drawing of an exemplary embodiment of a charged particle multi-beamlet lithography system.

FIG. 2 shows a simplified schematic drawing of an exemplary embodiment of a charged particle multi-beamlet lithography machine 1, which may be used for implementing a maskless pattern writer. Such a lithography machine suitably comprises a beamlet generator generating a plurality of beamlets, a beamlet modulator patterning said beamlets into modulated beamlets, and a beamlet projector for projecting said beamlets onto a surface of a target. The target is for example a wafer. The beamlet generator typically comprises a source and at least one aperture array. The beamlet modulator is typically a beamlet blanker with a blanking deflector array and a beam stop array. The beamlet projector typically comprises a scanning deflector and a projection lens system.

In the embodiment shown in FIG. 2, the lithography machine 1 comprises an electron source 3 for producing a homogeneous, expanding electron beam 4. Beam energy is preferably maintained relatively low in the range of about 1 to 10 keV. To achieve this, the acceleration voltage is preferably low, the electron source preferably kept at between about −1 to −10 kV with respect to the target at ground potential, although other settings may also be used.

The electron beam 4 from the electron source 3 may pass a double octopole and subsequently a collimator lens 5 for collimating the electron beam 4. As will be understood, the collimator lens 5 may be any type of collimating optical system. Subsequently, the electron beam 4 may impinge on a beam splitter, which is in one suitable embodiment an aperture array 6A. The aperture array 6A may block part of the beam and may allow a plurality of subbeams 20 to pass through the aperture array 6A. The aperture array preferably comprises a plate having through-holes. Thus, a plurality of parallel electron subbeams 20 may be produced.

A second aperture array 6B may create a number of beamlets 7 from each subbeam. Beamlets are also being referred to as e-beams. The system may generate a large number of beamlets 7, preferably about 10,000 to 1,000,000 beamlets, although it is of course possible to use more or less beamlets. Note that other known methods may also be used to generate collimated beamlets. This allows the manipulation of the subbeams, which turns out to be beneficial for the system operation, particularly when increasing the number of beamlets to 5,000 or more. Such manipulation is for instance carried out by a condenser lens, a collimator, or lens structure converging the subbeams to an optical axis, for instance in the plane of the projection lens.

A condenser lens array 21 (or a set of condenser lens arrays) may be included behind the subbeam creating aperture array 6A, for focusing the subbeams 20 towards a corresponding opening in the beam stop array 10. A second aperture array 6B may generate beamlets 7 from the subbeams 20. Beamlet creating aperture array 6B is preferably included in combination with the beamlet blanker array 9. For instance, both may be assembled together so as to form a subassembly. In FIG. 2, the aperture array 6B produces three beamlets 7 from each subbeam 20, which strike the beam stop array 10 at a corresponding opening so that the three beamlets are projected onto the target by the projection lens system in the end module 22. In practice a much larger number of beamlets may be produced by aperture array 6B for each projection lens system in end module 22. In one embodiment, 49 beamlets (arranged in a 7×7 array) may be generated from each subbeam and are directed through a single projection lens system, although the number of beamlets per subbeam may be increased to 200 or more.

Generating the beamlets 7 stepwise from the beam 4 through an intermediate stage of subbeams 20 has the advantage that major optical operations may be carried out with a relatively limited number of subbeams 20 and at a position relatively remote from the target. One such operation is the convergence of the subbeams to a point corresponding to one of the projection lens systems. Preferably the distance between the operation and the convergence point is larger than the distance between the convergence point and the target. Most suitably, use is made of electrostatic projection lenses in combination herewith. This convergence operation enables the system to meet requirements of reduced spot size, increased current and reduced point spread, so as to do reliable charged particle beam lithography at advanced nodes, particularly at nodes with a critical dimension of less than 90 nm.

The beamlets 7 may next pass through an array of modulators 9. This array of modulators 9 may comprise a beamlet blanker array having a plurality of blankers, which are each capable of deflecting one or more of the electron beamlets 7. The blankers may more specifically be electrostatic deflectors provided with a first and a second electrode, the second electrode being a ground or common electrode. The beamlet blanker array 9 constitutes with beam stop array 10 a modulating device. On the basis of beamlet control data, the modulating means 8 may add a pattern to the electron beamlets 7. The pattern may be projected onto the target 24 by means of components present within an end module 22.

In this embodiment, the beam stop array 10 comprises an array of apertures for allowing beamlets to pass through. The beam stop array, in its basic form, may comprise a substrate provided with through-holes, typically round holes although other shapes may also be used. In one embodiment, the substrate of the beam stop array 8 is formed from a silicon wafer with a regularly spaced array of through-holes, and may be coated with a surface layer of a metal to prevent surface charging. In one embodiment, the metal may be of a type that does not form a native-oxide skin, such as CrMo.

In one embodiment, the passages of the beam stop array 10 may be aligned with the holes in the beamlet blanker array 9. The beamlet blanker array 9 and the beamlet stop array 10 typically operate together to block or let pass the beamlets 7. If beamlet blanker array 9 deflects a beamlet, it will not pass through the corresponding aperture in beamlet stop array 10, but instead will be blocked by the substrate of beamlet block array 10. But if beamlet blanker array 9 does not deflect a beamlet, then it will pass through the corresponding apertures in beamlet stop array 10 and will then be projected as a spot on a target surface 13 of the target 24.

The lithography machine 1 may furthermore comprise a data path for supplying beamlet control data, e.g. in the form of pattern bitmap data, to the beamlet blanker array 9. The beamlet control data may be transmitted using optical fibers. Modulated light beams from each optical fiber end may be projected on a light sensitive element on the beamlet blanker array 9. Each light beam may hold a part of the pattern data for controlling one or more modulators coupled to the light sensitive element.

Subsequently, the electron beamlets 7 may enter the end module. Hereinafter, the term 'beamlet' refers to a modulated beamlet. Such a modulated beamlet effectively comprises time-wise sequential portions. Some of these sequential portions may have a lower intensity and preferably have zero intensity—i.e. portions stopped at the beam stop. Some portions may have zero intensity in order to allow positioning of the beamlet to a starting position for a subsequent scanning period.

The end module 22 is preferably constructed as an insertable, replaceable unit, which comprises various components. In this embodiment, the end module may comprise a beam stop array 10, a scanning deflector array 11, and a projection lens arrangement 12, although not all of these need be included in the end module and they may be arranged differently.

After passing the beamlet stop array 10, the modulated beamlets 7 may pass through a scanning deflector array 11 that provides for deflection of each beamlet 7 in the X- and/or Y-direction, substantially perpendicular to the direction of the undeflected beamlets 7. In this embodiment, the deflector array 11 may be a scanning electrostatic deflector enabling the application of relatively small driving voltages.

Next, the beamlets may pass through projection lens arrangement 12 and may be projected onto a target surface 24 of a target, typically a wafer, in a target plane. For lithography applications, the target usually comprises a wafer provided with a charged-particle sensitive layer or resist layer. The projection lens arrangement 12 may focus the beamlet, for example resulting in a geometric spot size of about 10 to 30 nanometers in diameter. The projection lens arrangement 12 in such a design for example provides a demagnification of about 100 to 500 times. In this preferred embodiment, the projection lens arrangement 12 is advantageously located close to the target surface.

In some embodiments, a beam protector may be located between the target surface 24 and the focusing projection lens arrangement 12. The beam protector may be a foil or a plate, provided with needed apertures, for absorbing the resist particles released from the wafer before they can reach any of the sensitive elements in the lithography machine. Alternatively or additionally, the scanning deflection array 9 may be provided between the projection lens arrangement 12 and the target surface 24.

Roughly speaking, the projection lens arrangement 12 focuses the beamlets 7 to the target surface 24. Therewith, it further ensures that the spot size of a single pixel is correct. The scanning deflector 11 may deflect the beamlets 7 over the target surface 24. Therewith, it needs to ensure that the position of a pixel on the target surface 24 is correct on a microscale. Particularly, the operation of the scanning deflector 11 needs to ensure that a pixel fits well into a grid of pixels which ultimately constitutes the pattern on the target surface 24. It will be understood that the macroscale positioning of the pixel on the target surface is suitably enabled by a wafer positioning system present below the target 24.

Such high-quality projection may be relevant to obtain a lithography machine that provides a reproducible result. Commonly, the target surface 24 comprises a resist film on top of a substrate. Portions of the resist film may be chemically modified by application of the beamlets of charged particles; i.e. electrons. As a result thereof, the irradiated portion of the film may be more or less soluble in a developer, resulting in a resist pattern on a wafer. The resist pattern on the wafer may subsequently be transferred to an underlying layer, i.e. by implementation, etching and/or deposition steps as known in the art of semiconductor manufacturing. Evidently, if the irradiation is not uniform, the resist may not be developed in a uniform manner, leading to mistakes in the pattern. Moreover, many of such lithography machines make use of a plurality of beamlets. No difference in irradiation ought to result from deflection steps.

Figure 3:
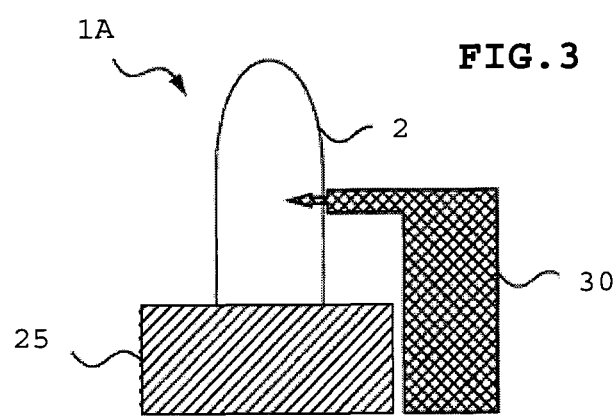
FIG. 3 is a conceptual diagram showing an exemplary maskless lithography system.

FIG. 3 shows a conceptual diagram of an exemplary charged particle lithography system 1A, divided into three high level sub-systems: a wafer positioning system 25, an electron optical column 20, and data path 30. The wafer positioning system 25 moves the wafer 24 under the electron optical column 20 in the x-direction. The wafer position system 25 may be provided with synchronization signals from the data path sub-system 30 to align the wafer with the electron beamlets generated by the electron-optical column 20. The electron-optical column 20 may include the charged particle multi-beamlet lithography machine 1 as shown in FIG. 2. Switching of the beamlet blanker array 9 may also be controlled via the data path sub-system 30, using pattern bitmap data.

In FIGS. 4A-4D exemplary embodiments of a data path sub-system 30 are shown for a lithography system 301A-301D with control and data interfaces forming the data path sub-system 30. The diagrams show a hierarchical arrangement with three interfaces, a cluster interface 303, cluster element interface 305, and the lithography subsystem interfaces 307. Multiple lithography subsystems 316 are shown, each including a charged particle multi-beamlet lithography machine 1 such as shown in FIG. 2. It is possible that there is only on lithography subsystem 316.

Subsystems 316 include, for example, a wafer load subsystem (WLS), wafer positioning subsystem (WPS), an illumination optics subsystem (ILO) for generating electron beamlets, a pattern streaming subsystem (PSS) for streaming beam switching data to the lithography element, a beam switching subsystem (BSS) for switching the electron beamlets on and off, a projection optics subsystem (POS) for projecting beamlets onto the wafer, a beam measurement subsystem (BMS), and a metrology subsystem (MES).

Each subsystem 316 may operate independently and may include a memory for storing instructions and a computer processor for executing the instructions. The memory and processor may be implemented in each subsystem as a plug-in client (PIC) 315. A suitable implementation of a subsystem may include, for example, a personal computer running the Linux operating system. The subsystems may include a hard disk or non-volatile memory for storing their operating system so that each subsystems boots from this disk or memory. These and other features discussed below enable a design where each subsystem may be an autonomous unit which can be designed, built and tested as an independent unit without needing to consider constraints imposed by other subsystems. For example, each subsystem may be designed with sufficient memory and processing capacity to properly perform the functions of the subsystem during its operating cycle, without needing to take into account the demands on memory and processing capacity made by the other subsystems. This is particularly advantageous during development and upgrade of the system, when these requirements are in flux. With this design the total required memory and processing capacity may be increased, and redundancy of these components may need to be implemented within each subsystem. However, the simplified design may lead to faster development and simpler upgrade.

The subsystems 316 may be designed to receive commands via the control network 420 and may execute the commands independently from the other subsystems, reporting results for the command execution and transferring any resulting execution data upon request.

The subsystems 316 may be designed as autonomous units, but designed to boot from a central disk or memory, for example on the data network hub. This reduces the reliability problem and cost of individual hard disks or non-volatile memory in each subsystem, and permits more easy software upgrade of a subsystem by updating the boot image for the subsystem in the central location The cluster interface 303 may comprise interfaces for communication between a lithography cluster front-end 306 and one or more host systems 302, and/or between the cluster front-end 306 and one or more operator consoles 304.

The cluster element interface 305 may comprise interfaces for communication between the cluster front-end 306 and a lithography element network comprising a element control unit 312 and/or a data network hub 314. The element control unit 312 may be in communication with a data network hub 314 via link 406, wherein the communication is preferably uni-directional from the element control unit 312 to the data network hub 314.

The lithography subsystem interface 307 may comprise interfaces between the element control unit 312 and the lithography subsystems 316, and between the data network hub 314 and the lithography subsystems 316. The subsystems 316 may communicate with the element control unit 312 via control network 420, and the subsystems 316 may communicate with the data network hub 314 via data network 421.

The operator interfaces and interfaces to higher-level host supervisory and automation computers may be made not with the individual lithography elements but at the cluster front-end 306.

Preferably the data path 320 directly connects pattern streamer 319 to the subsystem(s) responsible for modulating or switching the charged particle beams. The pattern streamer 319 may stream pattern data to the lithography subsystems 316 to control the modulating and switching of the charged particle beams. The pattern data is typically streamed to the relevant subsystems in a bit-map format, since the quantity of data is too great for local storage at the subsystem.

The subsystems 316 may be connected via a control network to a element control unit 312, also referred to as a Support Subsystem Control or SUSC. The element control unit 312 may comprise memory and a computer processor for controlling operation of the lithography subsystems 316.

Figure 4A:
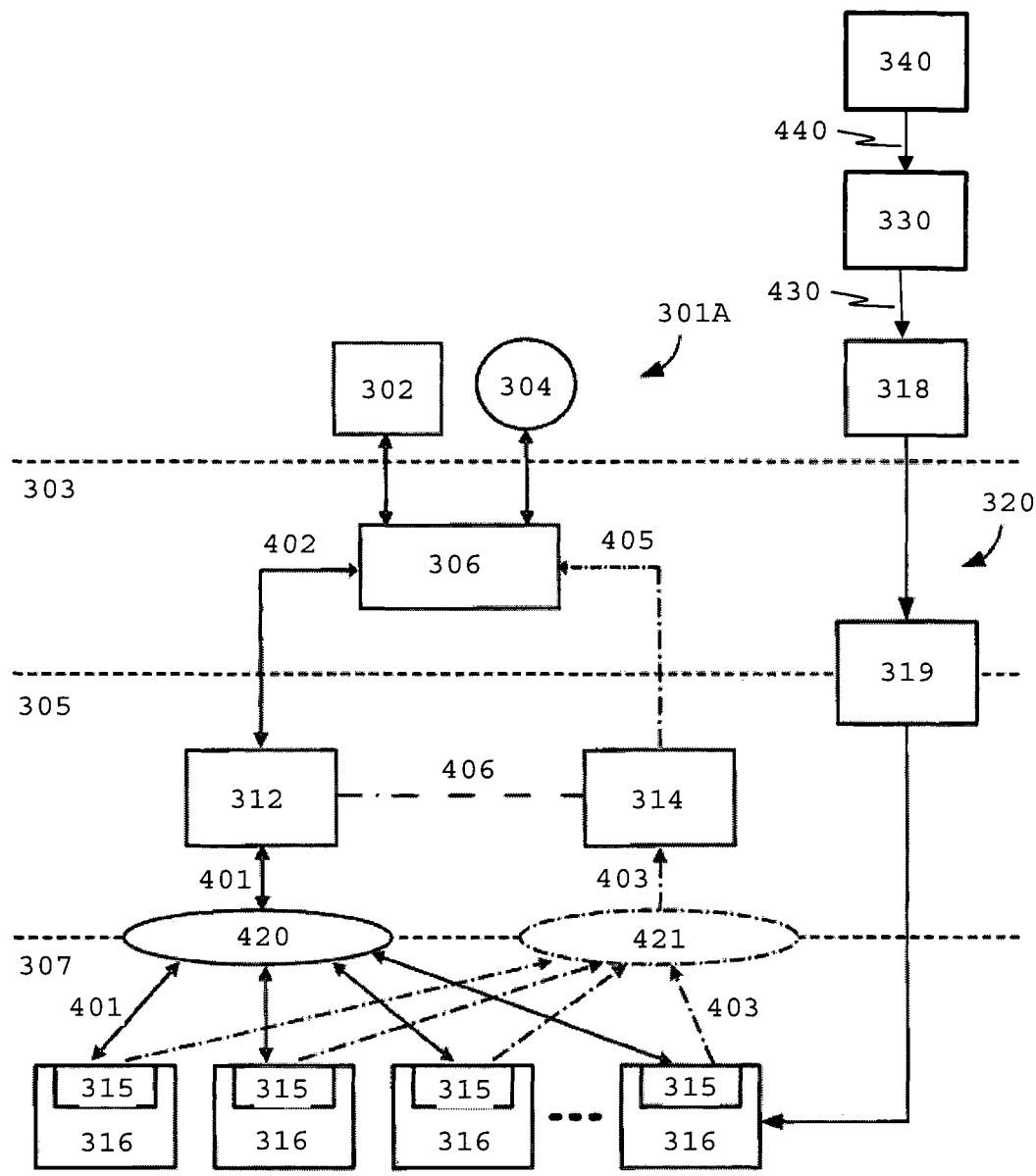
FIGS. 4A-4D are schematic diagrams of exemplary embodiments of a network architecture for a lithography system according to the invention.
Figure 4B:
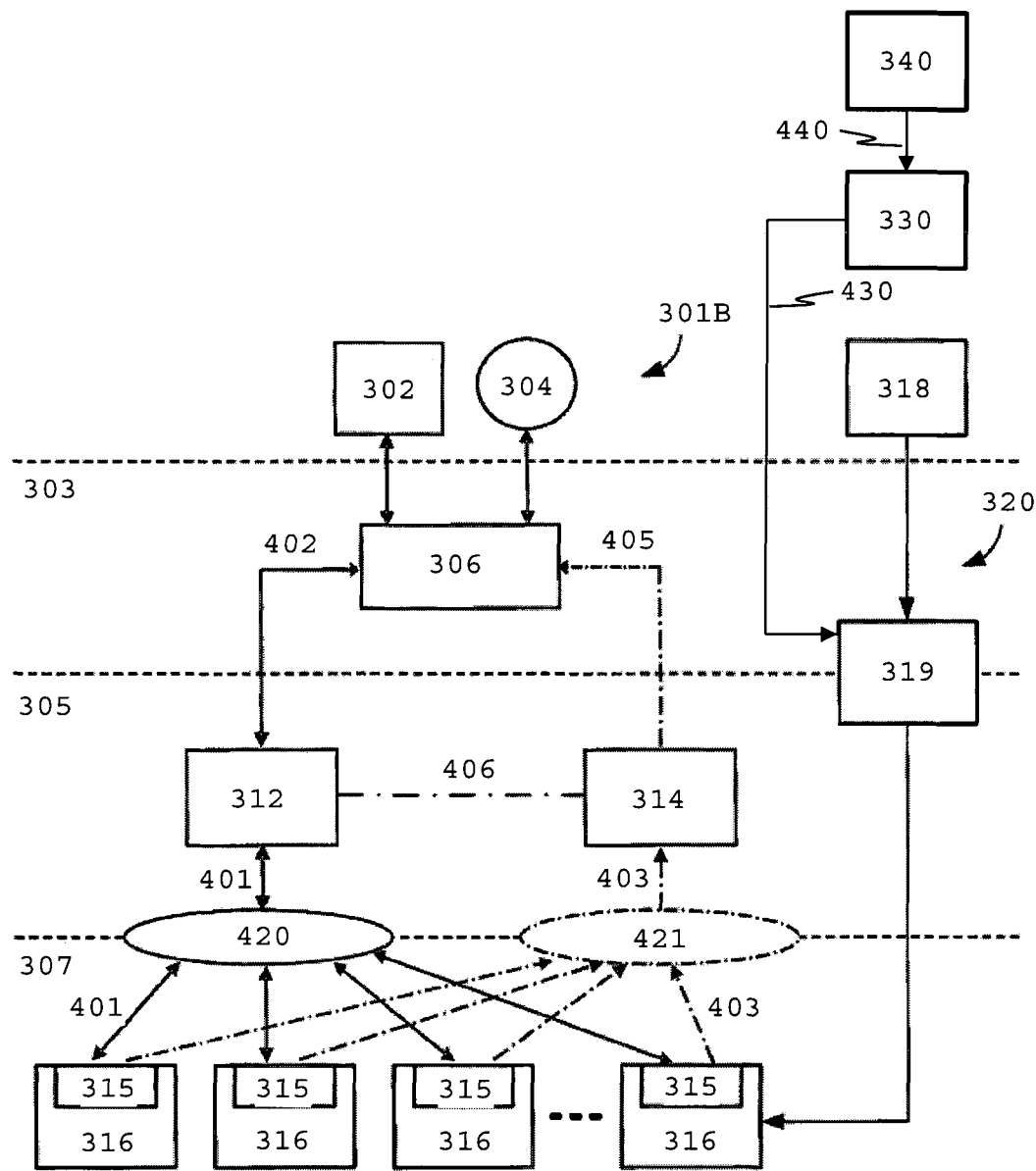

In the examples of FIG. 4A and FIG. 4B the pattern data streamed from the pattern streamer 319 to the lithography subsystem 316 may include the data for the common chip design part and the data for the unique chip design part. In FIG. 4A the unique chip design part may be added to the pattern data in the pattern data processing unit 318. In FIG. 4B the unique chip design part may be added to the pattern data in the pattern streamer 319.

Figure 4C:
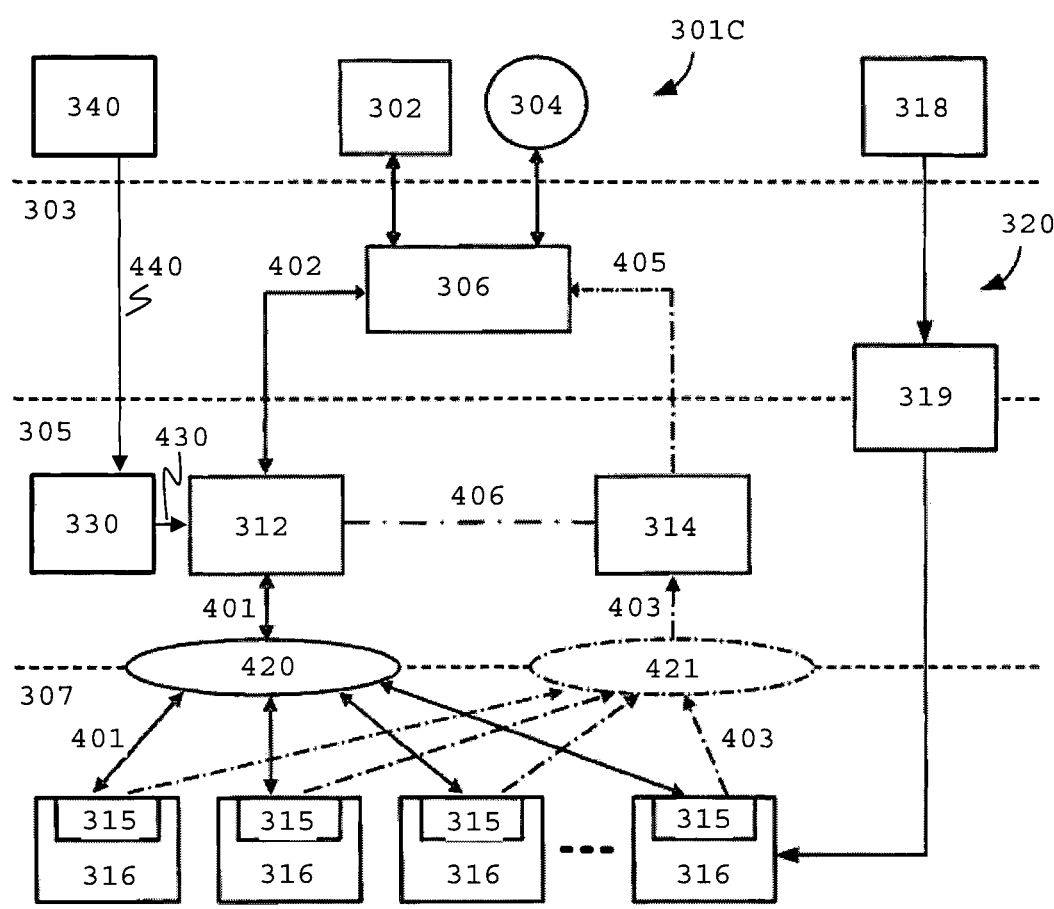
Figure 4D:
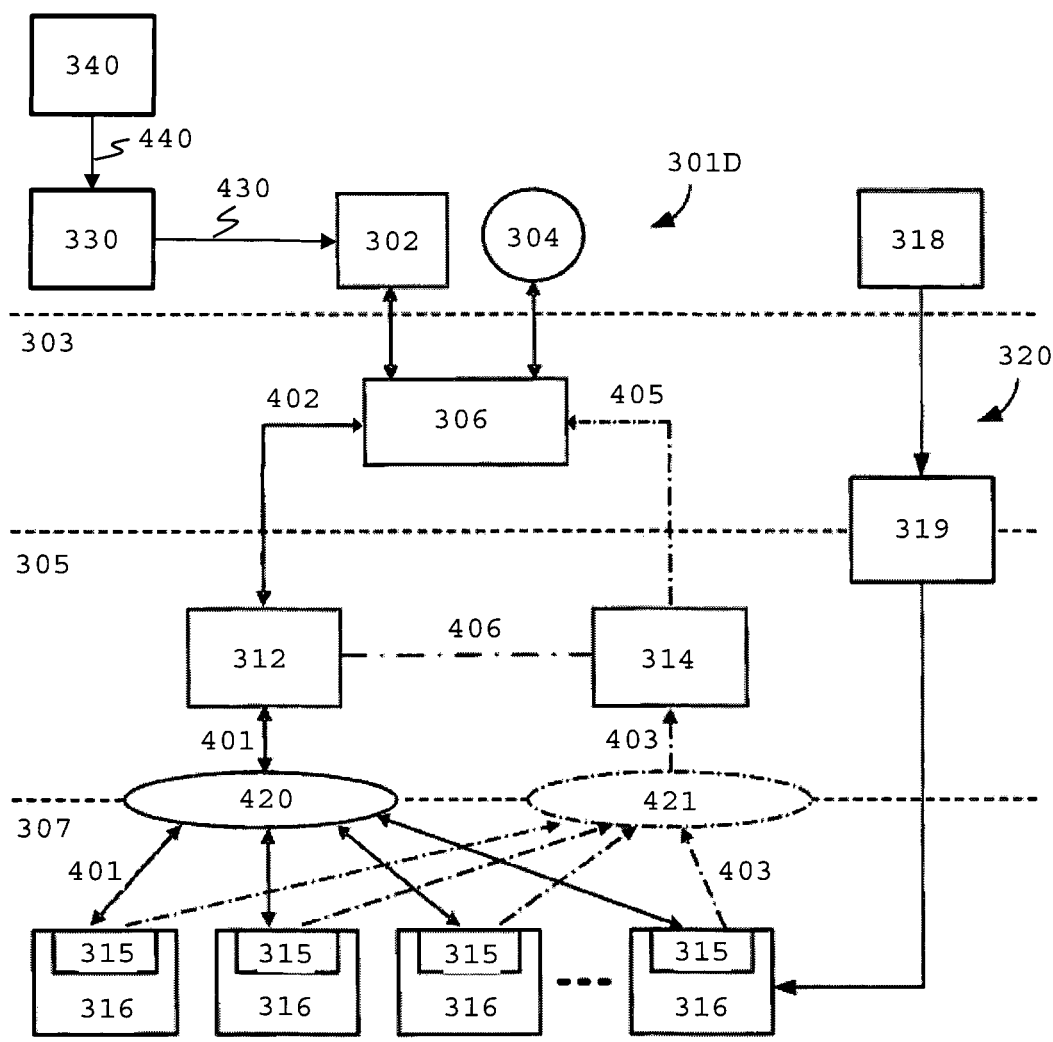

In the examples of FIG. 4C and FIG. 4D the pattern data streamed from the pattern streamer 319 to the lithography subsystem 316 may include the data for the common chip design part. In FIG. 4C the unique chip design part may be added to the pattern data by the lithography subsystem 316 under control of the element control unit 312. In FIG. 4D the unique chip design part may be added to the pattern data by the lithography subsystem 316 under control of the host system 302.

In FIGS. 4A-4D the pattern streamer 319 may be controlled by the element control unit 312 via the control network 420. Furthermore, the pattern streamer 319 may be a part of the lithography subsystem 316.

Figure 5:
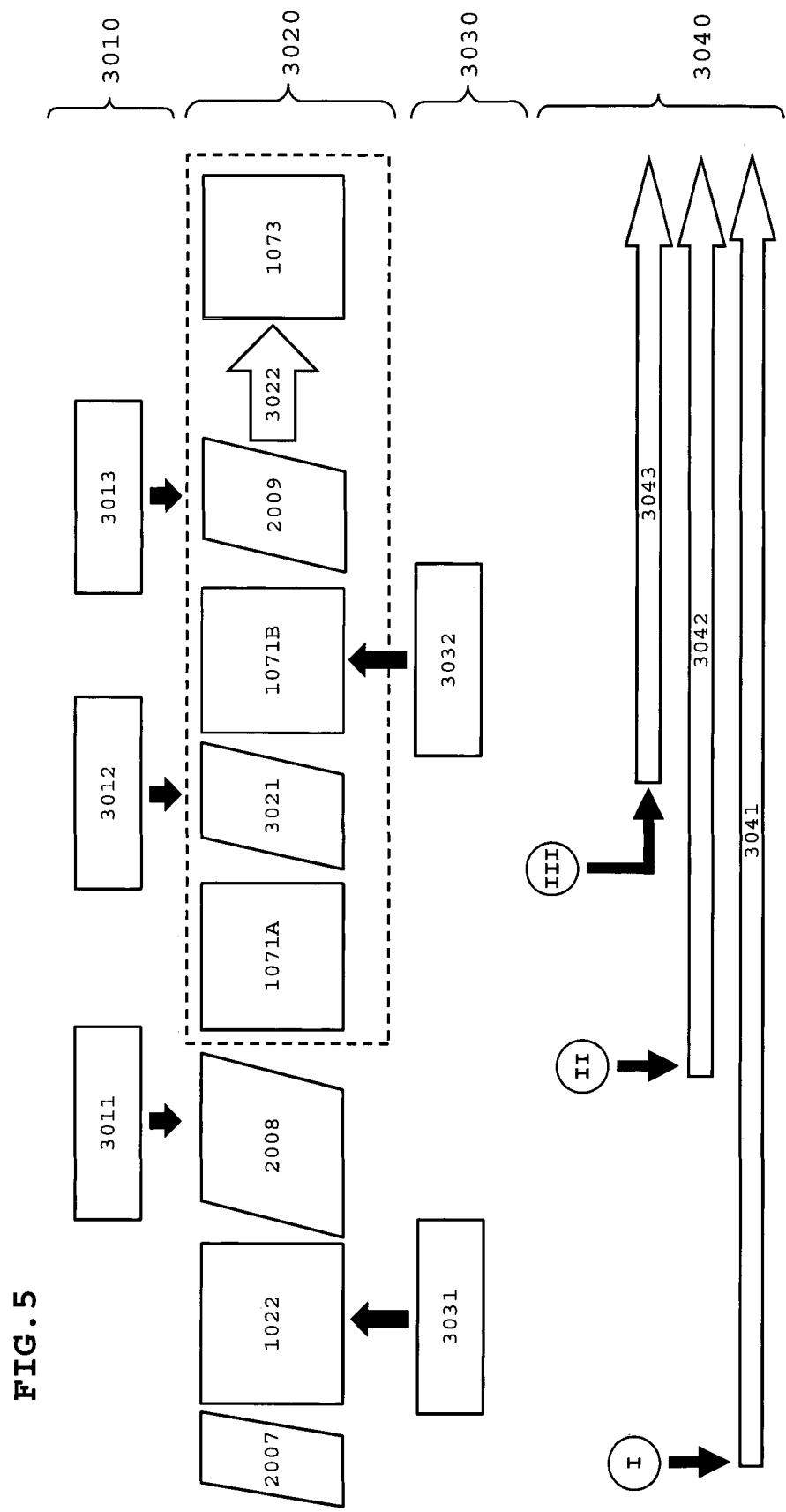
FIG. 5 shows an exemplary functional flow diagram of an embodiment of a data path using real-line rasterization.

FIG. 5 shows an exemplary functional flow diagram of an embodiment of a data path using real-line rasterization. In FIG. 3 the functional flow diagram is split into four sections: 3010 is used to indicate a data format of underlying data outputs/inputs; 3020 shows the process flow including data outputs/inputs (parallelograms) and functional elements (rectangles); 3030 is used to indicate process steps performed at overlying functional elements; and 3040 is used to indicate how often the process steps are typically performed, e.g. once per design 3041, once per wafer 3042 or once per field 3043. Roman I, II and III indicate when the feature data set and/or the selection data may be provided to the data path.

Input to the process may be GDS-II design layout data 2007, or a design layout in any other suitable format such as an OASIS data format, defining the common chip design part. The pattern data processing system 318 may preprocess 1022 the GDS-II file once per design, as indicated by the arrow 3041 at the bottom.

Preferably the preprocessing 1022 does not involve the unique chip design part, enabling the pattern data preprocessing system 318 to be located at a less secured environment. It is also desirable to minimize exposure time of the unique chip design part for security reasons. The security aspect is important as the uniqueness of the chip will typically be used for data security, traceability and anti-counterfeiting applications. The processes within the dashed block, i.e. from software processing 1071A until hardware processing 1073 are typically performed at the lithography machine 1,1A enabling a more secure operating environment. By inserting the unique chip design part at a later stage, the amount of time that the code is used within the lithography system 301A-301D can be minimized.

The unique chip design part may be inserted into the pattern data at various stages in the functional flow, indicated by roman I, II and III.

The unique chip design part may be inserted into the pattern data upon processing of the design layout data input, in this example GDSII input, indicated by roman I. At this stage the pattern data processing is typically performed in a vector based data format. As this operation is typically performed at the pattern data processing unit 318 located in a less secure environment, insertion of the unique chip design part at this stage I is least preferred.

More preferably the insertion of the unique chip design part into the pattern data may be performed at the software processing stage 1071A as indicated by roman II, or at the streaming stage 1071B as indicated by roman III. The S/W processing stage 1071A is typically performed once per wafer, as indicated by the second arrow 3042 from the bottom. The streaming stage 1071B is typically performed once per field or once per chip, as indicated by the third arrow 3043.

The S/W processing stage 1071A and the streaming stage 1071B may be implemented at the pattern streamer 319. The hardware processing stage 1073 on the right side of the functional flow typically involves the blanker being controlled by the pattern data 2009 including the common chip design part and the unique chip design part.

The GDS-II format pattern data may undergo off-line processing 1022, typically including proximity effect correction, resist heating correction, and/or smart boundaries (jointly depicted 3031). The resulting corrected vector pattern data 2008 may be in a vector format an may include dose information, depicted as 3011. This off-line processing 1022 is usually performed once for a given pattern design, for one or more batches of wafers. In case of inserting the unique chip design part at this stage, indicated by roman I, the off-line processing 1022 may need to be performed more frequently, up to once per wafer or even once per field or chip.

Next, in-line processing of the vector tool input data 2008 may be performed to rasterize the vector data 2008 to generate pattern system streamer (PSS) bitmap data 3021 in e.g. a 4-bit greyscale bitmap format 3012.

This processing is typically performed in software. The unique chip design part may be added at this stage, as indicated by roman II. The pattern streamer 319 may then processes the PSS format data 3021 to generate blanker format data 2009, possibly including corrections involving a full or partial pixel shift in the X and/or Y direction for beam position calibration, field size adjustment, and/or field position adjustment as before on the bitmap data, jointly depicted 3032. Alternatively to entry point II, the unique design part may be added at this stage as indicated by roman III. This processing may be performed per field. The blanker format pattern data 2009 may then be transmitted 3022 to the lithography system for exposure of the wafer.

As indicated in FIG. 5, rasterization may be performed at the streaming stage 1071B, which typically involves real-time processing performed in hardware. Corrections for beam position calibration, field size adjustment, and/or field position adjustment 3032 may be performed on vector format PSS format data 3021, and then rasterization may convert this to a blanker format 2009. When the corrections are made on vector data, both full pixel shifts and subpixel shifts in the X and Y direction can be made.

The pre processing 1022 of the GDSII input 2007 is preferably performed such to enable insertion of the unique chip design part at a later stage. Hereto bit space may be reserved within intermediate pattern data or place holders may be added to intermediate vector format data where the unique chip design data is to be inserted at a later stage. Advantageously, besides the mentioned security advantage, this avoids the need to regenerate huge amounts of pattern data before each exposure of the wafer for each unique chip, which would require very high CPU power and very large amounts of memory.

In FIGS. 4A-4D communication 402 between the cluster front-end 306 and SUSC 312 may be designed for transfer of process programs (PPs) to the SUSC 312. A protocol based on JavaScript Object Notation (JSON) may be used for this purpose. The protocol preferably provides an instruction for creation of process jobs (PJs), transferring the PP file and any associated parameters, to instruct the SUSC 312 to create a PJ based on the PP. Additional commands may include Abort and Cancel instructions.

Communication from the SUSC 312 to the cluster front-end 306 may include acknowledgment messages, progress reporting, and error and alarm messages.

Communication 401 between the SUSC 312 and lithography subsystems 316 across control network 420 is preferably strictly controlled using only the element control unit protocol to ensure a quasi real-time performance in the network. Communication 405 between SUSD 314 and cluster front-end 306 may be designed for retrieval of PJ results, job tracing and data logging from the SUSD 314. A HyperText Transfer Protocol (HTTP) may be used for this communication link.

Communication 403 between the lithography subsystems 316 and SUSD 314 may be designed for one-way collection of data from the subsystems 316. The data may be communicated using a variety of protocols, such as syslog, HDF5, UDP and others.

High volume data may be sent using a User Datagram Protocol (UDP) to send data without the large overhead of handshaking, error checking and correction. Due to the resulting very low transmission overhead, the data may thus be regarded as being received in real-time.

The hierarchical data format HDF5 may be used for transmission and storage of the high-frequency data. HDF5 is well suited to storing and organizing large amounts of numerical data, but is usually not used in a UDP environment. Other data formats such as CSV or TCP can also be used, particularly for low level (low volume) data.

The operation of the lithography subsystems 316 may be controlled using the PP, which may comprise a sequence of actions to be performed. The element control unit 312 may be loaded with a PP, and may schedule and execute the PP as requested by a host system 302 or an operator though an operator console 304.

Process programs (PP) and process jobs (PJ) may be based on the SEMI standard, e.g. SEMI E30: "Generic Model for Communications and Control of Manufacturing Equipment (GEM)", SEMI E40: "Standard for Processing Management", SEMI E42: "Recipe Management Standard: Concepts, Behavior, and Message Services", and/or SEMI E139: "Specification for Recipe and Parameter Management (RaP)". The PP may take the role of a recipe, e.g. as defined in the SEMI E40 standard. Although the SEMI standards specify many requirements on how to deal with recipes, the standards may be contradictory so that recipes are preferably avoided. Instead, editable and unformatted PP may be used in the form of so-called Binary Large Objects (BLOBs).

The PP may be a pre-planned and reusable portion of the set of instructions, settings and parameters that determine the processing environment of the wafer and that may be subject to change between runs or processing cycles. PPs may be designed by the lithography tool designers or generated by tooling.

PPs may be uploaded to the lithography system by the user. PPs may be used to create PJs. A PJ may specify the processing to be applied to a wafer or set of wafers by a lithography subsystem 316. A PJ may define which PP to use when processing a specified set of wafers and may include parameters from the PP (and optionally from the user). A PJ may be a system activity started by a user or host system.

PPs may be used not only for controlling the processing of wafers, but also for service actions, calibration functions, lithography element testing, modifying element settings, updating and/or upgrading software. Preferably no subsystem behavior occurs other than what is prescribed in a PP, with the exception of certain allowed additional categories, such as automatic initialization during power-up of a module or subsystem, periodic and unconditional behavior of a subsystem, as far as those don't influence PJ execution, and the response to an unexpected power-off, emergency or EMO activation.

A PP may be divided into steps. Most steps comprise a command and identify a subsystem which is to perform the command. The step may also include parameters to be used in performing the command, and parameter constraints. The PP may also include scheduling parameters to indicate when a step is to be performed, e.g. to be performed in parallel, in sequence, or synchronized.

To execute a command step of the PJ, the element control unit 312 may send the command indicated in the PJ to the subsystem indicated in the relevant step of the PJ. The element control unit 312 may monitor timing and may receive the results from the subsystem.

In the example of FIG. 4A the pattern data processing system 318 may be configured to receive unique chip design data 430 from a unique data generator 330 and to insert the unique chip design data into the pattern data.

In the example of FIG. 4B the pattern streamer 319 may be configured to receive unique chip design data 430 from a unique data generator 330 and to insert the unique chip design data into the pattern data.

In the example of FIG. 4C the element control unit 312 may be configured to receive unique chip design data 430 from a unique data generator 330 and to control insertion of the unique chip design data into the pattern data. The unique chip design data may be transmitted to a lithography subsystem 316 with a process job.

In the example of FIG. 4D the host system 302 may be configured to receive unique chip design data 430 from a unique data generator 330 and to control insertion of the unique chip design data into the pattern data. The unique chip design data may be transmitted to a lithography subsystem 316 with a process job.

Generally, the unique chip design data 430 may be in a format that enables direct insertion into the pattern data. Alternatively the unique chip design data 430 comprises information that enables the data to be generated that is to be inserted into pattern data.

The unique chip design data 430 may be generated by the unique data generator 330 based on secret data 440 received from an external provider 340. Alternatively the secret data may be generated within the unique data generator 330. The secret data 440 may be encrypted and decryptable by the unique data generator 330. The secret data 440 may include secret keys and/or secret IDs.

The unique data generator 330 may be realized as a black box device. The unique chip design data 430 may be generated by the back box device. The black box device may be a source external to the maskless lithographic exposure system and is preferably located within a manufacturing part of the fab. The black box may be owned by a third party, e.g. an IP block owner or the owner of the manufactured chip, or a key management infrastructure owner. Advantageously the black box can be located within the fab close to the operations of the lithography machine, thereby minimizing public exposure of the unique chip design data. This in contrast to known chip manufacturing solutions, where a black box for individualizing chips is typically located outside of the fab and used to individualize the chips after being created.

A black box device may include an ID/key manager and a unique data generator 330 that cooperate in the creation of the unique chip design data 430. The ID/key manager may receive product ID/serial number information from a manufacturing database and batches of ID/key pairs from a key management service possibly located outside of the maskless lithographic exposure system. The product ID/serial number information and the batches of ID/key pairs may be used to control the generation of the unique chip design data 430. Furthermore, the product ID/serial number information may be used to track the chips through the creation process to be able the chips to be matched with their ID/serial numbers after being created. Alternatively or additionally, the product ID/serial number information may be used to include the ID/serial number in or on the chip by a not shown but known per se process.

Figure 6:
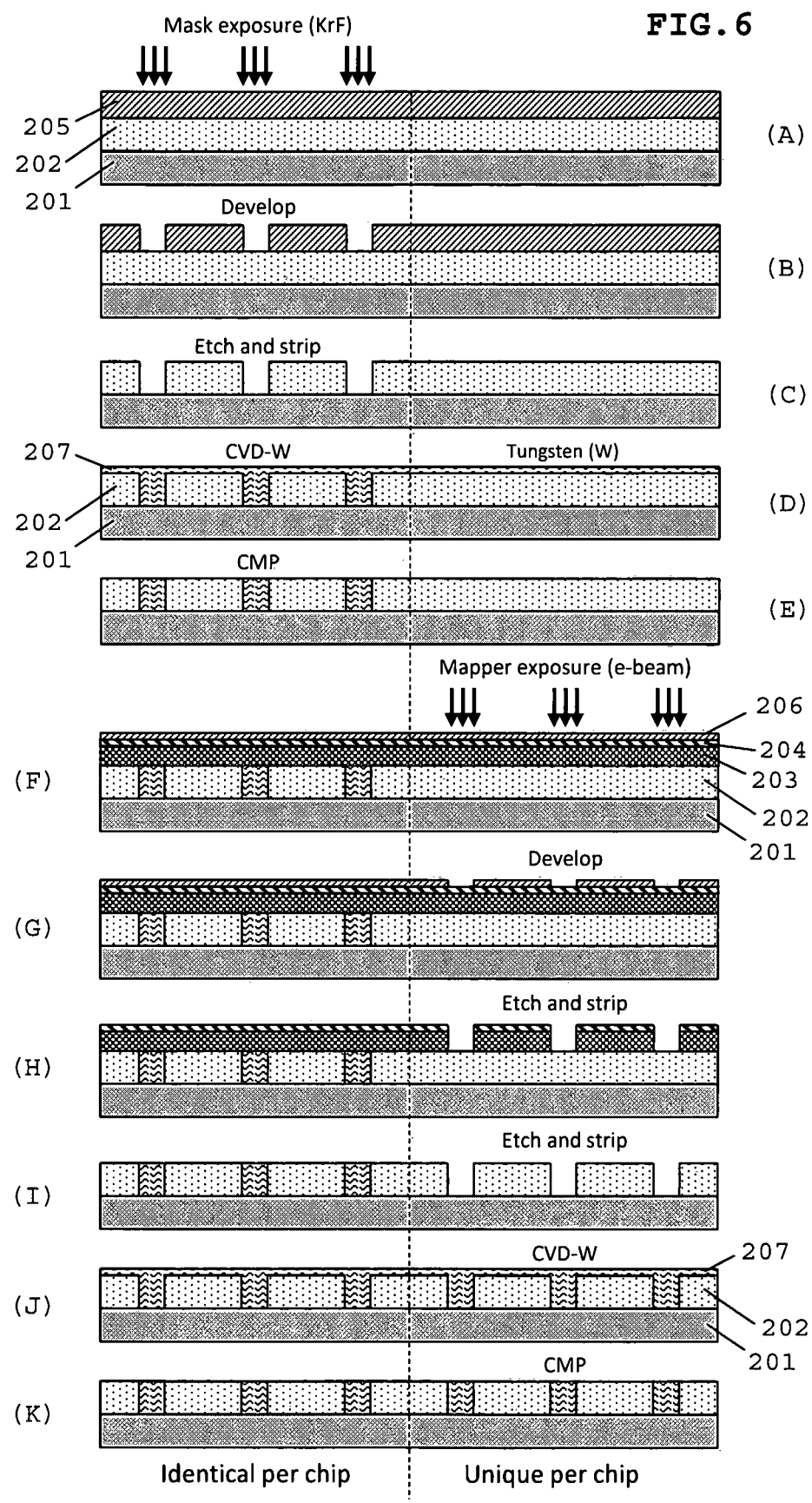
FIG. 6 shows a process of creating a unique chip according to an exemplary embodiment of the invention.

FIG. 6 shows a process of creating a unique chip according to an exemplary embodiment of the invention. In this embodiment the identical part of the chip may be created using photolithography and the unique part of the chip may be created using charged particle multi-beamlet lithography. The electron beam exposure method of the charged particle multi-beamlet lithography may also be referred to as Mapper exposure or e-beam.

At the beginning of the process of FIG. 6 the wafer may comprise five layers: a bottom metal layer 201, an isolation layer 202 (for example SiO2) and a top resist layer 205 (e.g. KrF resist).

For the creation of the identical part (e.g. common part 101), the top layer 205 may undergo a mask exposure, e.g. using KrF laser, followed by a development step wherein structures defined by the mask are removed from the resist layer 205. In an etching and stripping step these structures may be etched into the isolation layer 202 and the resist is removed.

Next, a conductive layer may be applied onto the etched and stripped isolation layer. For example a chemical vapor deposition with Tungsten (CVD-W) may be used. Chemical-mechanical planarization (CMP) may remove superfluous conductive material resulting in the wafer having the bottom metal layer and a layer comprising isolation material and conductive material as defined by the mask exposure.

Next, for the creation of the unique part (e.g. individualized area 102), the wafer may receive under layers 203 and 204 (e.g. SOC+SiARC HM) and an e-beam resist layer 206, covering the isolation layer 202 including the etched part from the photolithography phase. The top layer 206 may undergo an e-beam exposure followed by a development step wherein structures defined by the e-beams may be removed from the resist layer 206. In an etching and stripping step these structures may be etched into the SOC under layer 204 and SiARC under layer 203, and the resist may be removed. Next, the structures that are created in the under layers 203, 204 may be etched into the isolation layer 202, and the under layers 203, 204 may be stripped.

Figure 7:
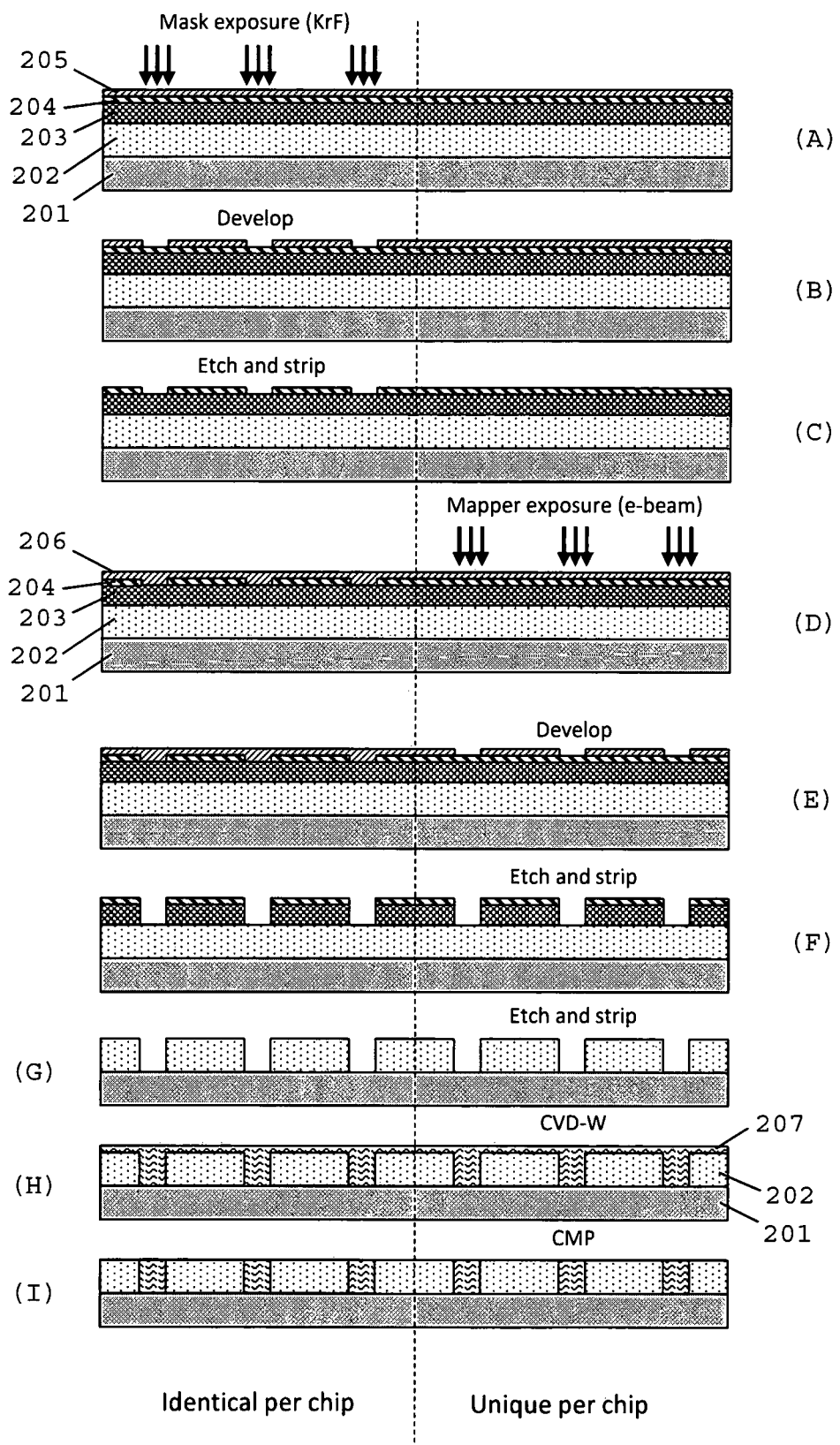
FIG. 7 shows a process of creating a unique chip according to another exemplary embodiment of the invention.

Next, a conductive layer 207 may be applied onto the etched and stripped isolation layer. For example a chemical vapor deposition with Tungsten (CVD-W) may be used. Chemical-mechanical planarization (CMP) may remove superfluous conductive material resulting in the wafer having the bottom metal layer and a layer comprising isolation material and conductive material as defined by the mask exposure and the e-beams:

In the embodiment of FIG. 6 two CMP steps may be needed. Dishing and double erosion effects caused by the CMP steps can affect the thickness of the isolation layer including the conductive material. This can have a negative impact on analogue and radio frequency performance of the chip. FIG. 7 shows an improved process for creating unique chips wherein only a single CMP step may be needed.

FIG. 7 shows a process of creating a unique chip according to another exemplary embodiment of the invention. In this embodiment the identical part (e.g. common part 101) of the chip may be created using photolithography and the unique part (e.g. individualized area 102) of the chip may be created using charged particle multi-beamlet lithography.

At the beginning of the process of FIG. 7 the wafer may comprise five layers: a bottom metal layer 201, an isolation layer 202 (for example SiO2), under layers 203 and 204 (e.g. SOC+SiARC HM) and a top resist layer 205 (e.g. KrF resist). Advantageously, the under layers 203 and 204 may be used for both the photolithography and the charged particle multi-beamlet lithography phase, thereby eliminating the need for a CMP step in the photolithography phase, as will be further explained below.

For the creation of the identical part, the top layer 205 may undergo a mask exposure, e.g. using KrF laser, followed by a development step wherein structures defined by the mask may be removed from the resist layer 205. In an etching and stripping step these structures may be etched into the SOC under layer 204 and the resist is removed.

Next, for the creation of the unique part, the wafer may receive an e-beam resist layer 206, covering the SOC under layer 204 including the etched part from the photolithography phase. The top layer 206 may undergo an e-beam exposure followed by a development step wherein structures defined by the e-beams may be removed from the resist layer 206. In an etching and stripping step these structures may be etched into the SOC under layer 204 and the resist is removed. Next, the structures that are created in the SOC under layer 204 in both the photolithography phase and the charged particle multi-beamlet lithography phase may be etched into the SiARC under layer 203 and subsequently into the isolation layer 202, and the under layers 203, 204 may be stripped.

Next, a conductive layer 207 may be applied onto the etched and stripped isolation layer for both the identical part and the unique part of the chip. For example a chemical vapor deposition with Tungsten (CVD-W) may be used. Chemical-mechanical planarization (CMP) may remove superfluous conductive material resulting in the wafer having the bottom metal layer and a layer comprising isolation material and conductive material as defined by the mask exposure and the e-beams.

Figure 8:
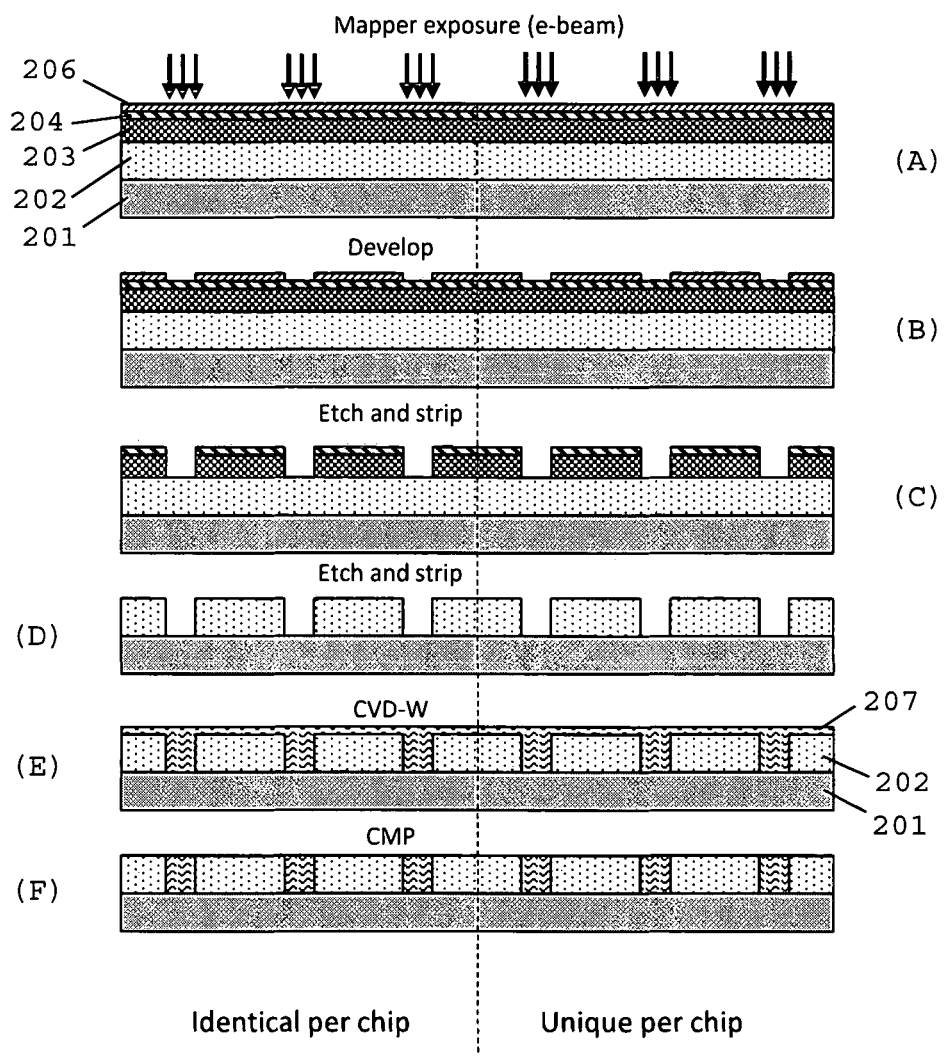
FIG. 8 shows a process of creating a unique chip according to another exemplary embodiment of the invention.

FIG. 8 shows a process of creating a unique chip according to another exemplary embodiment of the invention. In this embodiment both the identical part (e.g. common part 101) of the chip and the unique part (e.g. individualized area 102) of the chip may be created using charged particle multi-beamlet lithography.

At the beginning of the process of FIG. 8 the wafer may comprise five layers: a bottom metal layer 201, an isolation layer 202 (for example SiO2), under layers 203 and 204 (e.g. SOC+SiARC HM) and a top e-beam resist layer 206 (e.g. KrF resist).

The top layer 206 may undergo an e-beam exposure followed by a development step wherein structures defined by the e-beams may be removed from the resist layer 206. In an etching and stripping step these structures may be etched into the SOC under layer 204 and the SiARC under layer 203, and the resist may be removed. Subsequently the structures may be etched into the isolation layer 202, and the under layers 203, 204 are stripped.

Next, a conductive layer 207 may be applied onto the etched and stripped isolation layer for both the identical part and the unique part of the chip. For example a chemical vapor deposition with Tungsten (CVD-W) may be used. Chemical-mechanical planarization (CMP) may remove superfluous conductive material resulting in the wafer having the bottom metal layer and a layer comprising isolation material and conductive material as defined by the e-beams.

In the embodiments of FIG. 6 and FIG. 7 the unique part of the chip may be generated based on pattern data including a common chip design part and a unique chip design part, as discussed in conjunction with FIGS. 4A-5. The size of the common chip design part may depend on the size of the identical part of the chip created using photolithography. When a large portion of the identical part is covered by the photolithography, the common chip design part in the pattern data may be small. It is possible that the pattern data only includes a unique chip design part in case the unique part of the chip only or mostly has unique features.

In the embodiment of FIG. 8 the pattern data may include a common chip design part that is used to create the identical part of the chip and a unique chip design part that is used to create the unique part of the chip, as discussed in conjunction with FIGS. 4A-5.

Figure 9:
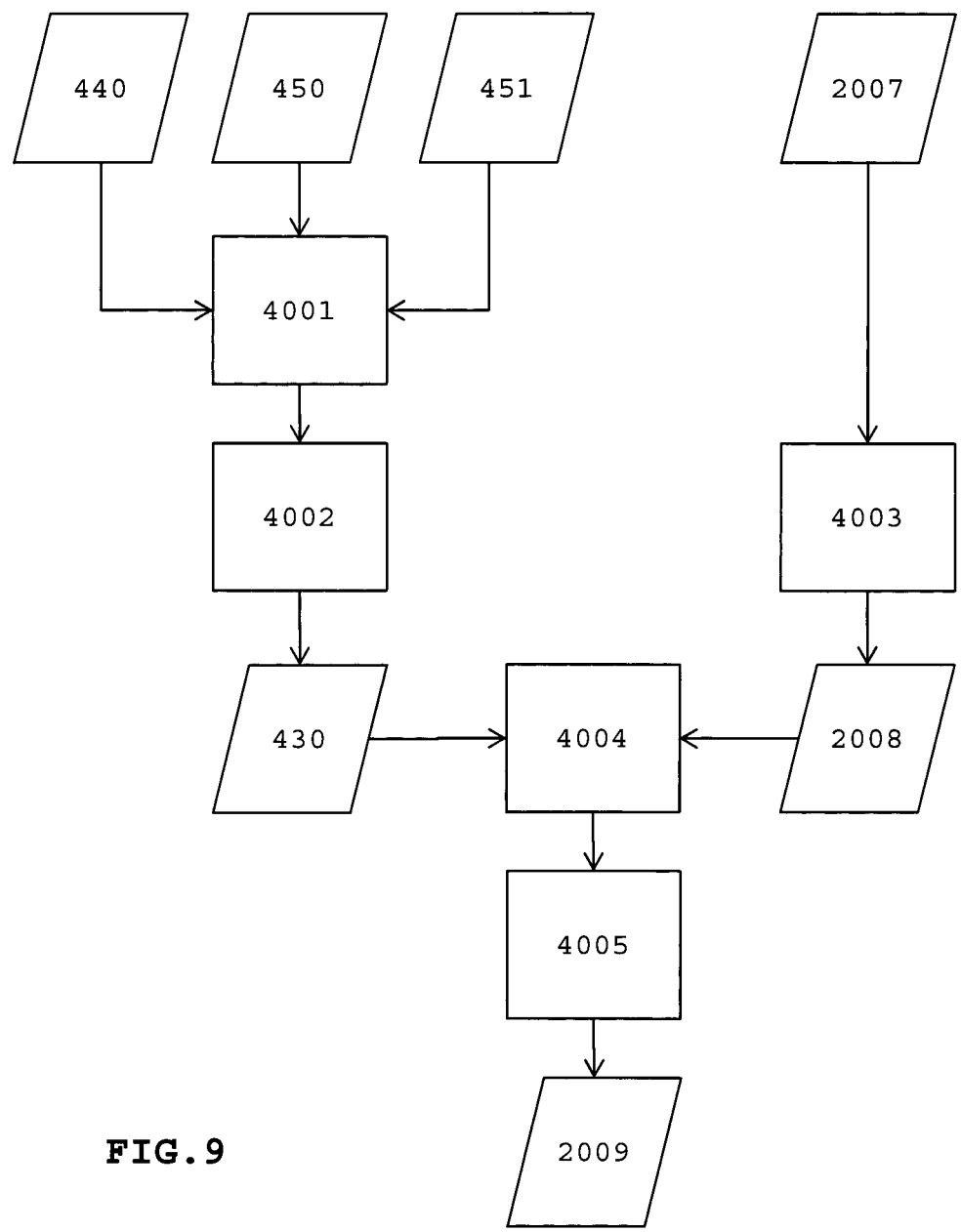
FIG. 9 shows a computer implemented method for generating non-common chip design data and pattern data according to an exemplary embodiment of the invention.

FIG. 9 shows a computer implemented method for generating non-common chip design data and for generating pattern data according to an exemplary embodiment of the invention.

The non-common chip design data 430 may be generated from secret data 440 in a generation step 4002. The non-common chip design data 430 may be generated 4001 under control of product identification information or serial number information 450 related to a chip to be manufactured and batches of identification/key pairs 451. The non-common chip design data may be further processed 4002, e.g. by including the non-common chip design data into a process job.

The pattern data 2009 may be generated from the non-common chip design data 430 and common chip design data 2007 by inserting 4004 the non-common chip design data 430 into the common chip design data 2007. The common chip design data 2007 may be processed 4003, e.g. by rasterizing the data from a vector based format into a bitmap based format. The pattern data 2009 may be processed 4005, e.g. by rasterizing the pattern data into a blanker data format.

One or more embodiments of the invention may be implemented as a computer program product for use with a computer system. The program(s) of the program product may define functions of the embodiments (including the methods described herein) and can be contained on a variety of computer-readable storage media. The computer-readable storage media may be non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information may be permanently stored; and (ii) writable storage media (e.g., hard disk drive or any type of solid-state random-access semiconductor memory, flash memory) on which alterable information may be stored.

The invention claimed is:
1. A method of creating electronic devices using a maskless lithographic exposure system comprising a maskless pattern writer, the method comprising:
   pre-processing a vector based input design file to generate pattern data in a bitmap format, the pattern data comprising common chip design data and one or more bit spaces reserved for non-common chip design data or information related thereto; and
   introducing the non-common chip design data or information related thereto into the one or more bit spaces of the pattern data before streaming the pattern data to the maskless pattern writer, wherein the common chip design data defines a common design layout part of an electronic device to be created on a wafer using the maskless pattern writer under control of said pattern data, the common design layout part being identical to other electronic devices created on the wafer, and wherein the non-common chip design data defines a non-common design layout part of said electronic device to be created on the wafer using the maskless pattern writer under control of said pattern data, the non-common design layout part being different from other electronic devices created on the wafer, the method further comprising generating the non-common chip design data in a unique data generator, wherein the maskless lithography exposure system comprises the unique data generator.

2. The method according to claim 1, wherein the common design layout part and the non-common design layout part of the wafer are exposed by the maskless pattern writer using electron beam exposure under control of said pattern data.

3. The method according to claim 1, wherein generating the non-common chip design data based on secret data received from the unique data generator.

4. The method according to claim 3, wherein the secret data includes at least one of a secret key and a secret ID.

5. The method according to claim 3, wherein the unique data generator receives the secret data from an external provider in an encrypted format.

6. The method according to claim 1, further comprising:
receiving in the unique data generator product identification information or serial number information related to a chip to be manufactured from a manufacturing database;
receiving in the unique data generator batches of identification/key pairs from a key management service;
controlling the generation of the non-common chip design data using the received product identification information or serial number information and the received identification/key pairs.

7. The method according to claim 1, wherein the maskless lithographic exposure system comprises an input generator for inputting the non-common chip design data or the information related thereto to a process job generator of an execution system in an encrypted manner in the form of encrypted code, a machine control part of the maskless pattern writer converting the encrypted code by intermixing with the pattern data in an obfuscated manner.

8. The method according to claim 1, wherein the non-common chip design data includes design data describing via connections between two or more layers.

9. The method according to claim 1, wherein the non-common chip design data includes design data describing active regions of electrical circuit elements.

10. The method according to claim 1, wherein processing of the non-common chip design data is performed in a secured operating environment.

11. The method according to claim 1, wherein the non-common chip design data or the information related thereto is introduced into the pattern data at a very late stage to minimize the amount of time that the non-common design data or the information related thereto is used within the maskless lithographic exposure system.

12. A maskless lithographic exposure system comprising a maskless pattern writer, wherein the maskless lithographic exposure system is configured to expose a pattern on a surface of a target according to pattern data, wherein the pattern data is obtained by:
a pre-processing of a vector based input design file to generate intermediate pattern data in a bitmap format, the intermediate pattern data comprising common chip design data and one or more bit spaces reserved for non-common chip design data or information related thereto, and
an insertion, by the maskless lithographic exposure system, of the non-common chip design data or information related thereto into the one or more bit spaces of the intermediate pattern data before streaming the pattern data to the maskless pattern writer, wherein the common chip design data defines a common design layout part of an electronic device to be created on a wafer using the maskless pattern writer under control of said pattern data, the common design layout part being identical to other electronic devices created on the wafer, and wherein the non-common chip design data defines a non-common design layout part of said electronic device to be created on the wafer using the maskless pattern writer under control of said pattern data, the non-common design layout part being different from other electronic devices created on the wafer, the maskless lithography system further comprising a unique data generator configured for generating the non-common chip design data.

13. The maskless lithographic exposure system according to claim 12, comprising a pattern data processing system configured to pre-process the vector based input design file used for generating the pattern data comprising the common chip design data, and a pattern streamer configured to receive the pattern data comprising the common chip design data and to insert the non-common chip design data into the pattern data.

14. The maskless lithographic exposure system according to claim 12, comprising a pattern streamer configured to stream the pattern data comprising the common chip design data to the lithography subsystem, and wherein the lithography subsystem is configured to insert the non-common chip design data into the pattern data.

15. The maskless lithographic exposure system according to claim 12, wherein the unique data generator is configured for generating the non-common chip design data based on secret data including at least one of a secret key and a secret ID.

16. The maskless lithographic exposure system according to claim 15, wherein the unique data generator is configured to receive the secret data from an external provider in an encrypted format.

17. The maskless lithographic exposure system according to claim 15, wherein the unique data generator is configured to generate the secret data.

18. The maskless lithographic exposure system according to claim 12, wherein the non-common chip design data includes design data describing via connections between two or more layers of the chip layout.

19. The maskless lithographic exposure system according to claim 12, wherein the non-common chip design data includes design data describing active regions of electrical circuit elements of the chip layout.

20. A data processing system comprising:
a memory storing a set of instructions; and one or more processors configured to execute the set of instructions to cause the data processing system to perform operations for generating pattern data, wherein the pattern data represents at least a part of one or more electronic devices, to be created under control of the pattern data using a maskless lithographic exposure system comprising a maskless pattern writer, wherein the pattern data is obtained from an intermediate pattern data in a bitmap format, and the intermediate pattern data is generated by pre-processing a vector based input design file, the intermediate pattern data comprising common chip design data and one or more bit spaces reserved for non-common chip design data or information related thereto, the operations comprise an inserting of the non-common chip design data or information related thereto into the one or more bit spaces of the intermediate pattern data to obtain the pattern data before streaming the pattern data to the maskless pattern writer, wherein the common chip design data defines a common design layout part of an electronic device to be created on a wafer using the maskless pattern writer under control of said pattern data, the common design layout part being identical to other electronic devices created on the wafer, wherein the non-common chip design data defines a non-common design layout part of said electronic device to be created on the wafer using the maskless pattern writer under control of said pattern data, the non-common design layout part being different from other chips created on the wafer, and wherein the non-common chip design data is generated in a unique data generator, wherein the maskless lithography exposure system comprises the unique data generator.

\* \* \* \* \*